US008825230B2

(12) United States Patent
Pangilinan et al.

(10) Patent No.: US 8,825,230 B2
(45) Date of Patent: Sep. 2, 2014

(54) MULTI CORE VEHICLE MANAGEMENT UNIFIED USER INTERFACE SYSTEM AND METHOD

(71) Applicant: Lockheed Martin Corporation, Bethesda, MD (US)

(72) Inventors: Lester J. Pangilinan, Endicott, NY (US); John Olsen, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/906,474

(22) Filed: May 31, 2013

(65) Prior Publication Data

US 2013/0253737 A1 Sep. 26, 2013

Related U.S. Application Data

(63) Continuation of application No. 13/354,502, filed on Jan. 20, 2012, now Pat. No. 8,467,915.

(51) Int. Cl.
*G06F 17/00* (2006.01)
*G08G 5/00* (2006.01)
*G01C 23/00* (2006.01)

(52) U.S. Cl.
CPC *G06F 17/00* (2013.01); *G08G 5/00* (2013.01); *G01C 23/00* (2013.01)
USPC ............................................. 701/3; 701/11

(58) Field of Classification Search
CPC ........... G06F 17/00; G08G 5/00; G01C 23/00
USPC ....................................... 701/3, 11
See application file for complete search history.

(56) References Cited

U.S. PATENT DOCUMENTS 4,169,264 A 9/1979 Parker
4,774,670 A 9/1988 Palmieri
(Continued)

FOREIGN PATENT DOCUMENTS

WO WO 2009/138983 A2 11/2009
WO WO 2011/012156 A1 2/2011

OTHER PUBLICATIONS

Notice of Allowance dated Feb. 22, 2013, in U.S. Appl. No. 13/354,502.
(Continued)

*Primary Examiner* — Mary Cheung
*Assistant Examiner* — Brian P Sweeney
(74) *Attorney, Agent, or Firm* — Miles & Stockbridge P.C.; James T. Carmichael

(57) ABSTRACT

A computerized method for providing a unified user interface to a plurality of flight management components encapsulated within a flight management system. The method can include receiving a flight management system input dataset from a first flight management system user interface device. The method can also include creating, with a processor programmed to provide a unified user interface, a plurality of flight management system input data portions to be transmitted to a plurality of destination flight management system components. The plurality of flight management system input data portions can be based on the flight management system input dataset and each flight management system input data portion can correspond to one of said plurality of destination flight management system components. Each of said plurality of flight management system input data portions can be transmitted from the processor to said corresponding destination flight management system component.

5 Claims, 23 Drawing Sheets

(56) References Cited

U.S. PATENT DOCUMENTS

| | | |
|---|---|---|
| 5,029,092 A | 7/1991 | Funatsu |
| 5,448,720 A | 9/1995 | Uriu et al. |
| 5,561,798 A | 10/1996 | Haderle et al. |
| 6,377,892 B1 | 4/2002 | Johnson et al. |
| 6,577,951 B1 | 6/2003 | Johnson et al. |
| 7,162,335 B2 | 1/2007 | He et al. |
| 7,437,225 B1 | 10/2008 | Rathinam |
| 7,493,196 B2 | 2/2009 | Caillaud et al. |
| 7,751,949 B2 | 7/2010 | Alanen et al. |
| 7,797,102 B2 | 9/2010 | Fortier |
| 8,121,747 B2 | 2/2012 | Loots et al. |
| 8,330,625 B2 | 12/2012 | McCullough et al. |
| 8,467,915 B1 | 6/2013 | Pangilinan et al. |
| 8,538,603 B2 | 9/2013 | O'Connor et al. |
| 8,600,585 B2 | 12/2013 | Pangilinan et al. |
| 2003/0158963 A1 | 8/2003 | Sturdy et al. |
| 2006/0209766 A1 | 9/2006 | Britz et al. |
| 2009/0150012 A1 | 6/2009 | Agam et al. |
| 2009/0234519 A1 | 9/2009 | Hoofd et al. |
| 2009/0316755 A1 | 12/2009 | Collette et al. |
| 2011/0087428 A1 | 4/2011 | Barnetche et al. |
| 2012/0143406 A1 | 6/2012 | O'Connor et al. |
| 2013/0013133 A1* | 1/2013 | Walter .......................... 701/11 |
| 2013/0124015 A1 | 5/2013 | Pangilinan et al. |
| 2013/0138268 A1 | 5/2013 | Pangilinan et al. |
| 2013/0138269 A1 | 5/2013 | Pangilinan et al. |
| 2013/0253737 A1 | 9/2013 | Pangilinan et al. |

OTHER PUBLICATIONS

International Search Report and Written Opinion in Application No. PCT/US2012/065276 dated Jul. 10, 2013.

Renehan, Jim, "Cutting Rack-Mounted Systems Down to Size", *Cluster Computing in Space-Constrained Applications*, Trenton Systems, Inc., 2009 [retrieved on Jul. 1, 2013]. Retrieved from the Internet <URL: http://www.trentonsystems.com/wp-content/uploads/cutting_rackmount_systems_down_to_size_whitepaper.pdf> entire document.

Nonfinal Office Action dated Mar. 7. 2013, in U.S. Appl. No. 13/307,860.

Notice of Allowance dated Sep. 16, 2013, in U.S. Appl. No. 13/307,764.

Nonfinal Office Action dated Jan. 2, 2014, in U.S. Appl. No. 13/296,495.

\* cited by examiner

MULTI CORE VEHICLE MANAGEMENT UNIFIED USER INTERFACE SYSTEM AND METHOD

Embodiments relate generally to multi core vehicle management systems and methods and, more particularly, to dual core flight management systems and methods providing pilots the ability to access and enable tactical and/or civil flight management system cores through an integrated pilot user interface.

Aircraft operating within civilian or commercial airspace may be required to provide flight data to air traffic controllers and other aircraft operating within the surrounding airspace. Military aircraft operating within this airspace may also be required to provide flight data to civilian or commercial air traffic controllers and other aircraft operating within the surrounding airspace. For military aircraft operating within civilian or commercial airspace, a need may exist to integrate one or more civil flight management systems and one or more tactical flight management systems into a multi core flight management system enabling pilots to control both the civil and tactical flight management systems through an integrated user interface.

One embodiment includes a computer system for providing a unified user interface to civil and tactical flight management components encapsulated within a dual core flight management system. The computer system can include a processor and a memory coupled to the processor. The memory can store software instructions that, when executed by the processor, cause the processor to perform operations. The operations can include receiving a flight management system input dataset from a flight management system user interface device. A civil flight management system input data portion and a tactical flight management system input data portion can be created based on said flight management system input dataset. The civil flight management system input data portion can be transmitted to a civil flight management system component and a civil flight management system component response can be received from the civil flight management system component. A tactical flight management system input data portion can be transmitted to a tactical flight management system component and a tactical flight management system component response can be received from the tactical flight management system component. A unified flight management system response message can be created consolidating the civil flight management system component response and the tactical flight management system component response. The unified flight management system response message can be transmitted to the flight management system user interface device. The unified flight management system response message can cause the flight management system user interface device to display a consolidated view of the civil flight management system component response and the tactical flight management system component response.

Another embodiment can include a computerized method for providing a unified user interface to a plurality of flight management components encapsulated within a flight management system. The method can include receiving a flight management system input dataset from a first flight management system user interface device. The method can also include creating, with a processor programmed to provide a unified user interface, a plurality of flight management system input data portions to be transmitted to a plurality of destination flight management system components. The plurality of flight management system input data portions can be based on the flight management system input dataset and each flight management system input data portion can correspond to one of the plurality of destination flight management system components. Each of the plurality of flight management system input data portions can be transmitted from the processor to the corresponding destination flight management system component.

Another embodiment can include a nontransitory computer readable medium having stored thereon software instructions that, when executed by a computer, cause the computer to perform a series of operations. The operations can include receiving a flight management system input dataset from a first flight management system user interface device and creating a plurality of flight management system input data portions to be transmitted to a plurality of destination flight management system components. The plurality of flight management system input data portions can be based on the flight management system input dataset, and each flight management system input data portion can correspond to one of the plurality of destination flight management system components. Each of the plurality of flight management system input data portions can be transmitted to the corresponding destination flight management system component and a plurality of flight management system component response messages can be received from the plurality of destination flight management system components. A unified flight management system response message can be created based on the plurality of flight management system component response messages. The flight management system unified response message can be transmitted to a second flight management system user interface device.

DETAILED DESCRIPTION

Figure 1:
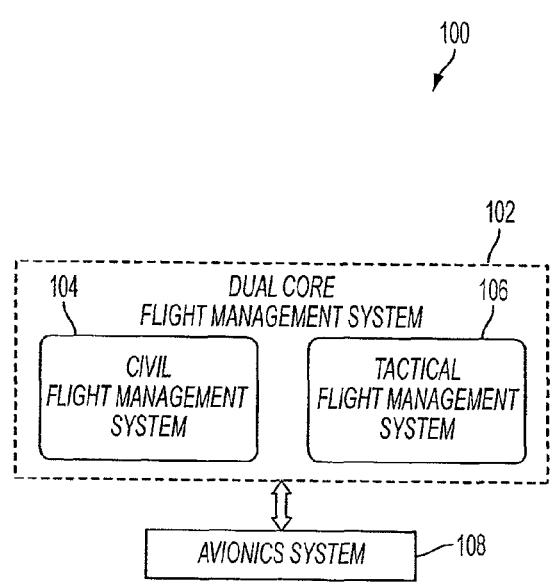
FIG. 1 is a block diagram of an exemplary embodiment of a dual core flight management system.

FIG. 1 is a block diagram of an exemplary embodiment of a dual core flight management system. System 100 can include a dual core flight management system 102 that can include a civil flight management system 104 and a tactical flight management system 106. The dual core flight management system 102 can transmit data to and/or receive data from an avionics system, or avionics subsystem, 108.

Figure 2:
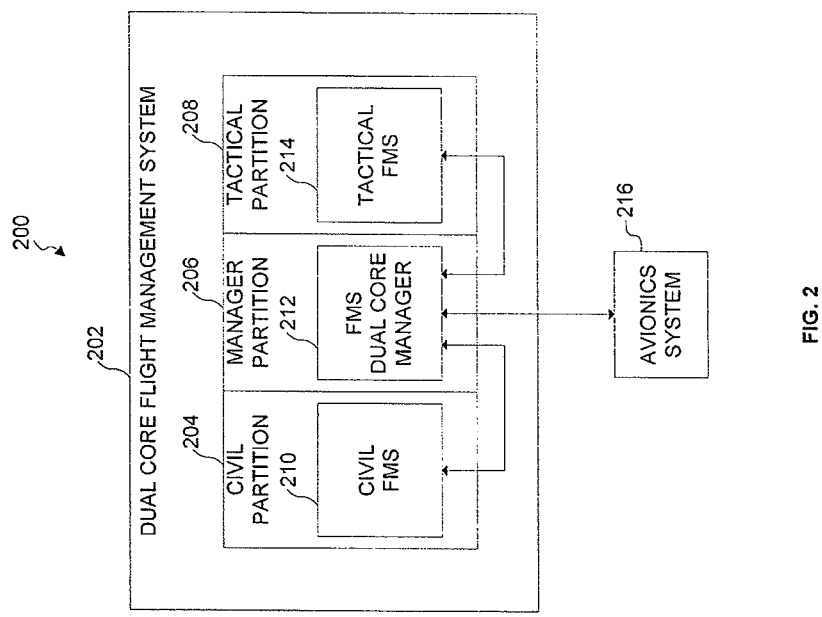
FIG. 2 is a block diagram of an exemplary embodiment of a partitioned dual core flight management system.

In operation, the dual core flight management system 102 can transmit data to and/or receive data from the avionics system 108 according to the processes shown in FIGS. 12, 13, 14, 15, 16, 17, and 18. The dual core flight management system 102 can provide an interface for the civil flight management system 104 and the tactical flight management system 106 to communicate with the avionics system 108 as shown in FIGS. 2 and 6. The dual core flight management system 102 can be a software and/or hardware wrapper for the civil flight management system 104 and the tactical flight management system 106, and can provide one flight management system interface through which the civil flight management system 104 and the tactical flight management system 106 can communicate with the avionics system 108 as shown in FIGS. 2, 4, 5, 6, 7, 8, 9, and 10. The dual core flight management system 102 can also provide a single interface through which the avionics system 108 can communicate with both the civil flight management system 104 and the tactical flight management system 106 as shown in FIGS. 2, 4, 5, 6, 7, 8, 9, and 10.

FIG. 2 is a block diagram of an exemplary embodiment of a partitioned dual core flight management system 200. System 200 can include a dual core flight management system 202 that can include a civil partition 204, a manager partition 206, and a tactical partition 208. The civil partition 204 can include a civil flight management system component 210. The manager partition 206 can include a flight management system dual core manager 212. The tactical partition 208 can include a tactical flight management system component 214. The dual core flight management system 202 can transmit data to and/or receive data from an avionics system 216.

In operation, the dual core flight management system 202 can be a computer system and can be partitioned into temporally and spatially isolated partitions 204-208. The civil flight management system component 210 and the tactical flight management system component 214 can each be software components that can run within partitions 204 and 208, respectively. The flight management system dual core manager 212 can be a software product executing on a processor within partition 206.

The flight management system dual core manager 212 can receive data from the civil flight management system component 210 and/or the tactical flight management system component 214 and transmit the appropriate corresponding data to avionics system 216, based on the content of the data received and the flight management system component from which the data originated, as shown in FIGS. 4, 5, 6, 7, 8, 9, and 10.

The flight management system dual core manager 212 can receive data from the avionics system 216 and transmit the appropriate corresponding data to the civil flight management system component 210 and/or the tactical flight management system component 214, based on the content of the data received and the destination flight management system component, as shown in FIGS. 4, 5, 6, 7, 8, 9, and 10.

It will be appreciated that the flight management system dual core manager 212 can be run within any partition of the dual core flight management system 202 or in its own manager partition 206 as shown.

Figure 3:
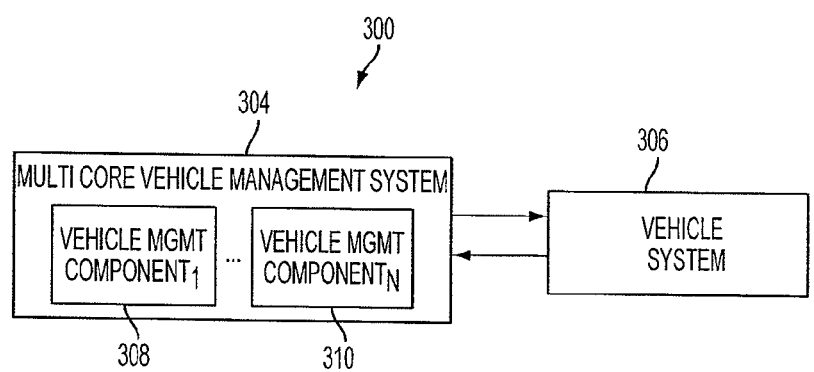
FIG. 3 is a block diagram of an exemplary embodiment of a multi core flight management system.

Additionally, it will be appreciated that, as shown in FIG. 3, the system 202 can also include a plurality of flight management system components that can each run within one of a plurality of partitions, and each of the plurality of flight management system components can transmit data to and/or receive data from the flight management system dual core manager 212.

The civil flight management system component 210 can include a software product, such as the Thales FMS 220 software product, certified to meet civilian aviation requirements, such as CNS/ATM and DO-178B. The tactical flight management system component 214 can include a software product certified to meet military aviation and/or tactical requirements that can be separate from those requirements imposed upon civilian aviation products. The temporal and spatial isolation of the flight management system components in system 200 can enable the updating of one flight management system component software product without the need to fully recertify and/or fully test the remaining flight management system component(s).

It will be appreciated that the dual core flight management system 202, including the flight management system dual core manager 212, the civil flight management system component 210, and the tactical flight management system component 214, can be executed on the same or different computers. When run on the same computer, a single board computer can run a partitioned real-time operating system such as LynxOS-178 RTOS to create the temporally and spatially isolated partitions (204-208) of the dual core flight management system 202.

FIG. 3 is a block diagram of an exemplary embodiment of a multi core flight management system. System 300 can include a multi core vehicle management system 304 that can include a plurality of vehicle management system components, vehicle management system component$_1$ 308 and vehicle management system component$_N$ 310. The multi core vehicle management system 304 can transmit data to and/or receive data from a vehicle system, or vehicle subsystem, 306.

In operation, the multi core flight management system 304 can transmit data to and/or receive data from the vehicle system 306 according to the processes shown in FIGS. 12, 13, 14, 15, 16, 17, 18, and 19. The multi core flight management system 304 can provide an interface for the plurality of vehicle management system components, vehicle management system component$_1$ 308 through vehicle management system component$_N$ 310, to communicate with the vehicle system 306 as shown in FIGS. 2 and 6. The multi core flight management system 304 can be a software and/or hardware wrapper for the plurality of vehicle management system components, vehicle management system component$_1$ 308 through vehicle management system component$_N$ 310, and can provide one vehicle management system interface through which the plurality of vehicle management system components, vehicle management system component$_1$ 308 through vehicle management system component$_N$ 310, can communicate with the vehicle system 306 as shown in FIGS. 2, 4, 5, 6, 7, 8, 9, and 10. The multi core flight management system 304 can also provide a single interface through which the vehicle system 306 can communicate with the plurality of vehicle management system components, vehicle management system component$_1$ 308 through vehicle management system component$_N$ 310, as shown in FIGS. 2, 4, 5, 6, 7, 8, 9, and 10.

Figure 4:
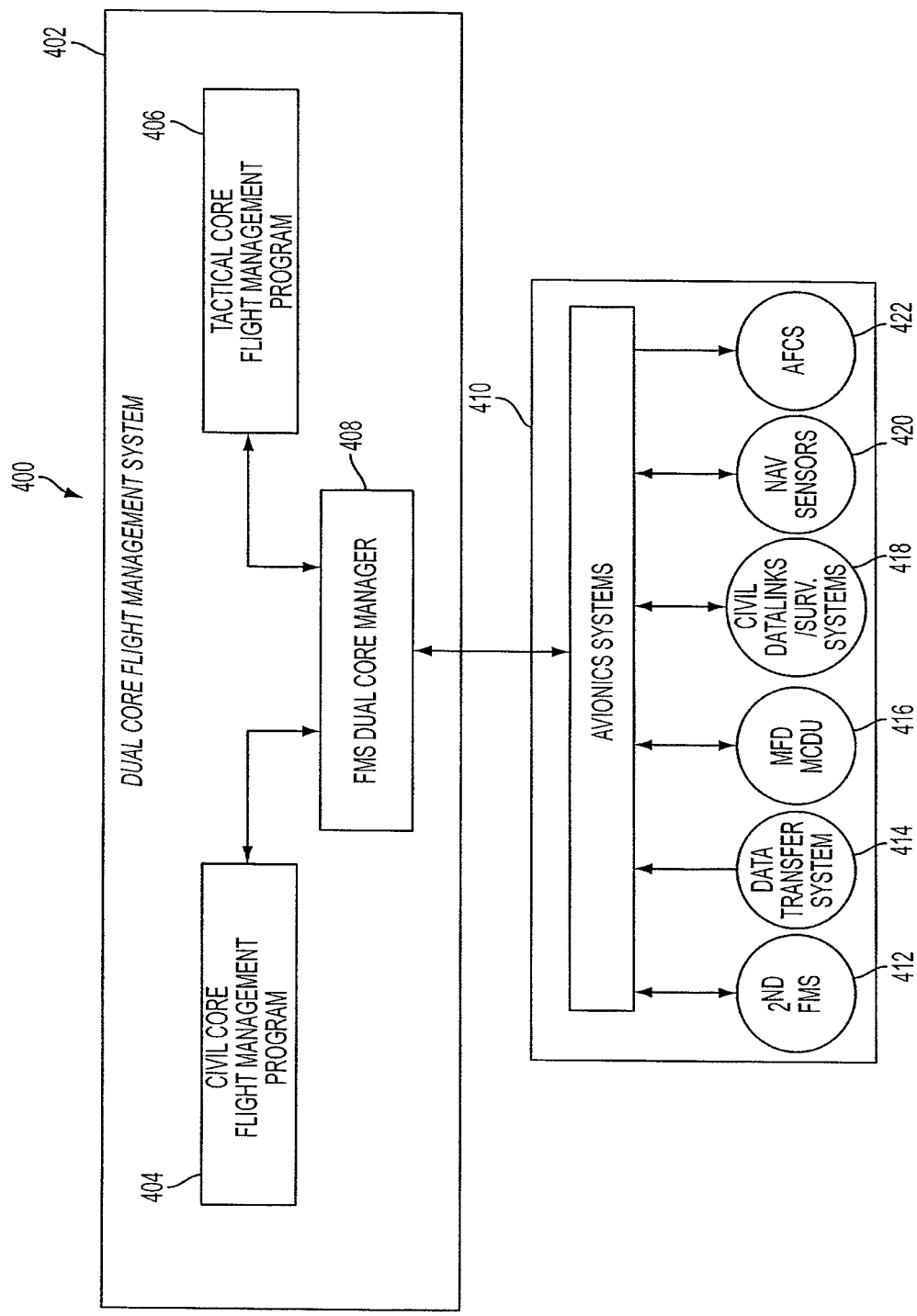
FIG. 4 is a block diagram of an exemplary embodiment of a flight management system dual core manager.

FIG. 4 is a block diagram of an exemplary embodiment of a flight management system dual core manager. The system 400 can include a dual core flight management system 402 that can include a civil flight management system component (or civil core flight management program component) 404, a tactical flight management system component (or tactical core flight management program component) 406, and a flight management system dual core manager 408. The dual core flight management system 402 can transmit data to and/or receive data from an avionics subsystem (or avionics systems) 410. The avionics systems 410 can include a second and/or redundant flight management system 412, a data transfer system 414, a multi-function display (MFD) and multipurpose control display unit (MDCU) 416, a civil datalink and surveillance system 418, navigational sensors 420, and an automatic flight control system (AFCS) 422.

In operation, the dual core flight management system 402 can transmit data to and/or receive data from the avionics systems 410. Data can be transmitted by the avionics systems 410 and received by the dual core flight management system 402 at the flight management system dual core manager 408.

The dual core flight management system 402 can be a computer system that can be partitioned into temporally and spatially isolated partitions, in which the civil flight management system component 404, the tactical flight management system component 406, and the flight management system dual core manager 408 can each run in a separate partition as shown in FIG. 2.

It will be appreciated that the avionics systems 410 may be attached to the dual core flight management system 402 using any connection type now known or later developed. Additionally, it will be appreciated that the avionics system can include any avionics hardware and software interfaces now known or later developed.

Figure 5:
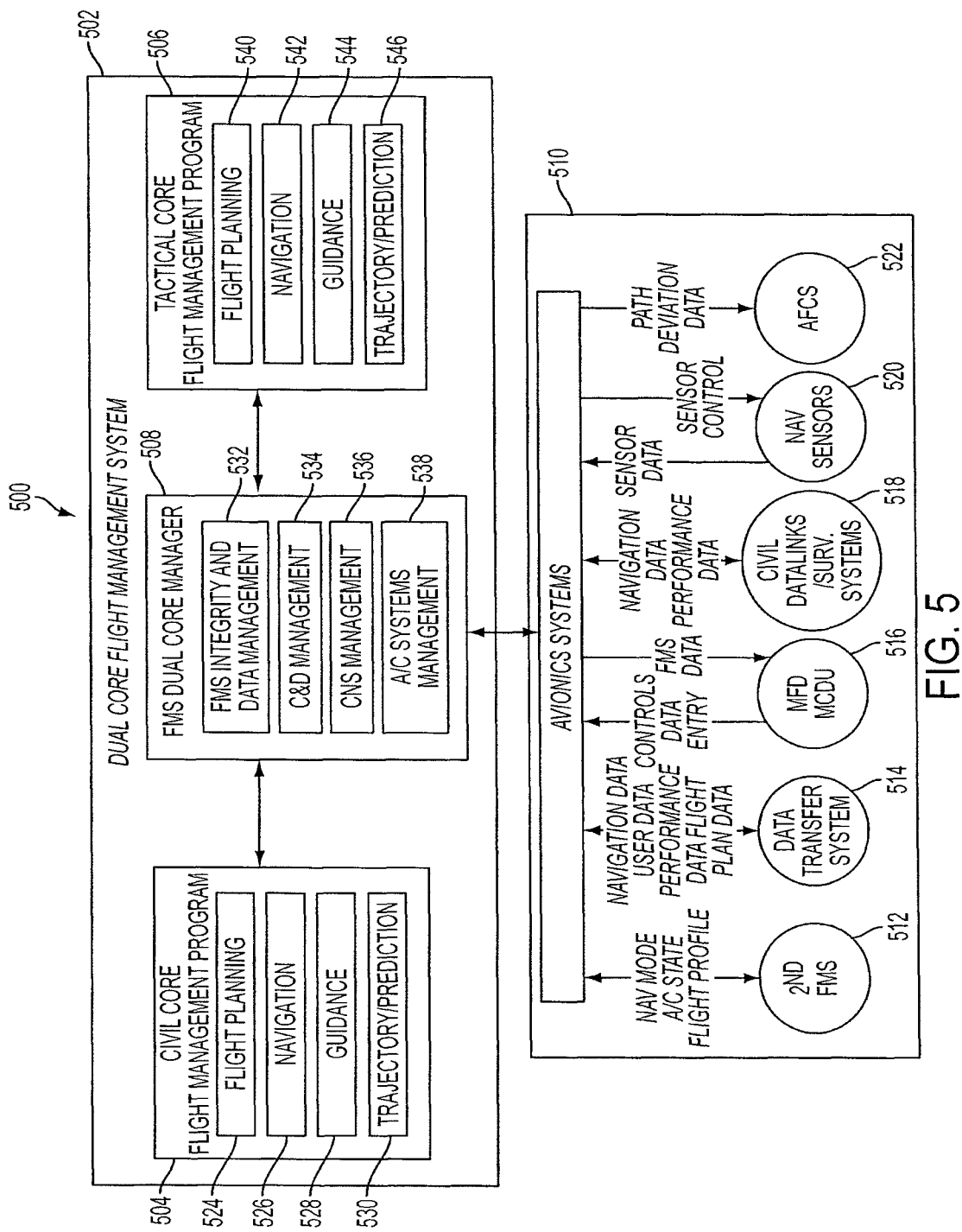
FIG. 5 is a block diagram of an exemplary embodiment of a flight management system dual core manager.
Figure 6:
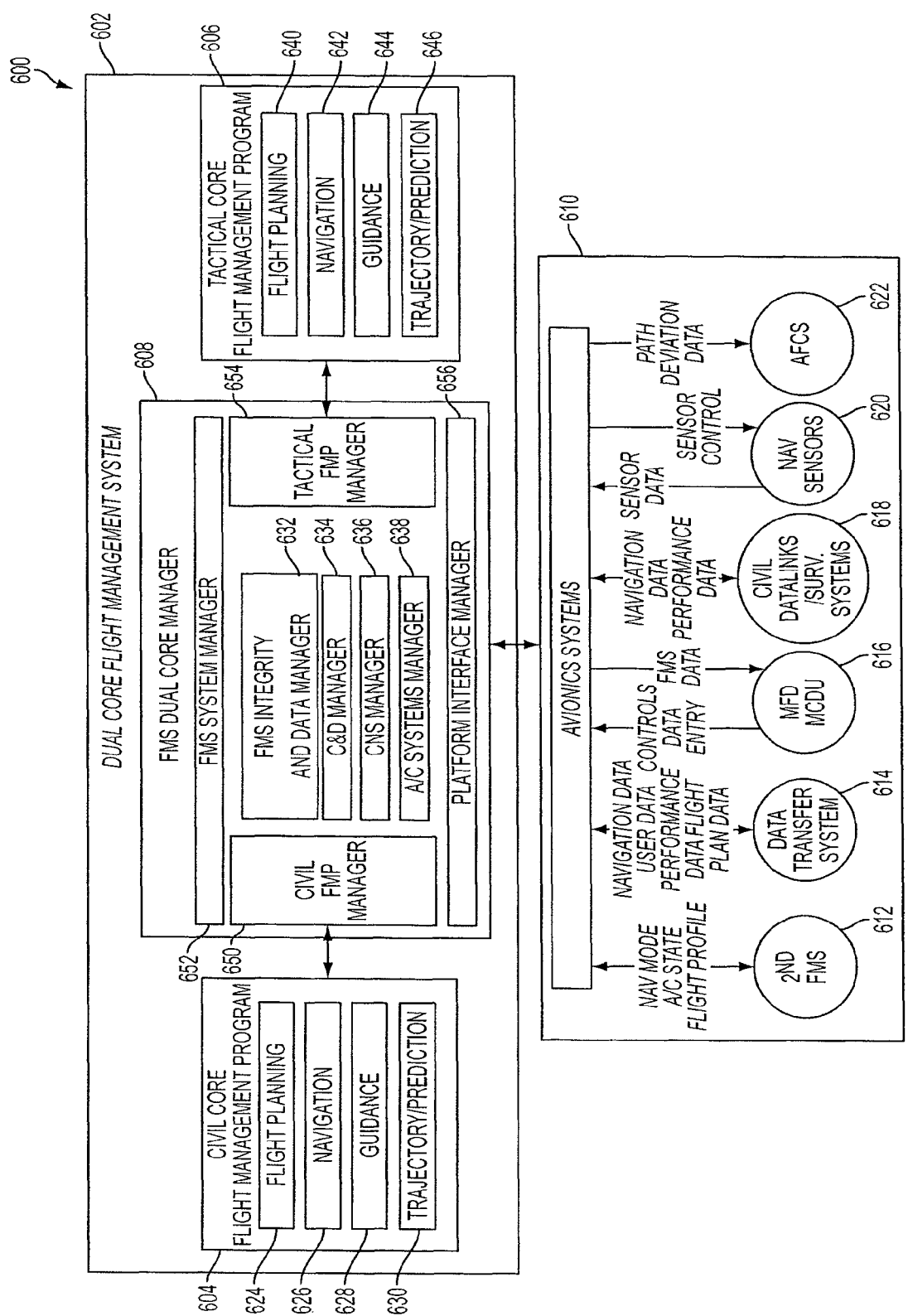
FIG. 6 is a block diagram of an exemplary embodiment of a dual core flight management system including a flight management system dual core manager.

FIG. 5 is a block diagram of an exemplary embodiment of a flight management system dual core manager. The system 500 can include a dual core flight management system 502 that can include a civil flight management system component (or civil core flight management program component) 504, a tactical flight management system component (or tactical core flight management program component) 506, and a flight management system dual core manager 508. The dual core flight management system 502 can transmit data to and/or receive data from an avionics subsystem (or avionics systems) 510. The avionics systems 510 can include a second and/or redundant flight management system 512, a data transfer system 514, a multi-function display and multipurpose control display unit 516, a civil datalink and surveillance system 518, navigational sensors 520, and an automatic flight control system 522.

The civil flight management system component 504 can include a flight planning module 524, a navigation module 526, a guidance module 528, and a trajectory/prediction module 530.

The civil flight planning module 524 can provide civil flight plan management, path definition, and/or a navigation database. Civil flight plan management can include the creation, modification, and/or selection of primary and secondary flight plans. Path definition can include providing sequences of waypoints, airways, flight levels, departure procedures, and/or arrival procedures to fly from the origin to the destination, and/or alternates. Providing a navigation database can include: managing the creation, designation, and/or storage or waypoints; providing a Jeppesen database and a user defined database; and/or providing appropriate NAVAIDs such as enroute, terminal, and/or approach procedures.

The civil navigation module 526 can provide navigation sensor management, localization, and/or a best computed position. Navigation sensor management can include controlling navigation sensors during civilian flight legs. Localization can be based on the available navigation sources.

The civil guidance module 528 can provide lateral navigation, vertical navigation, and speed control. Lateral navigation can be computed with respect to great circle paths defined by the flight plan, and/or with respect to transitional paths between the great circle paths, and/or with respect to preset headings or courses. Vertical navigation can be computed with respect to altitudes assigned to waypoints, and/or to paths defined by stored or computed profiles. Speed control along the desired path can be provided during one or more phases of flight.

The civil trajectory prediction module 530 can provide trajectory prediction and performance calculations. Trajectory prediction can include distance, time, speed, altitude, and/or gross weight at one or more future waypoints in the flight plan. Trajectory prediction can also include computing waypoints such as top-of-climb and/or top-of-descent. Providing performance calculations can include optimizing the vertical and/or speed profiles to minimize the cost of the flight and/or to meet some other criterion, subject to a variety of constraints.

The tactical flight management system component 506 can include a flight planning module 540, a navigation module 542, a guidance module 544, and a trajectory/prediction module 546.

The tactical flight planning module 540 can provide tactical flight plan management, tactical path definition, and/or a navigational database. Tactical flight plan management can include creation, modification, and/or selection of tactical flight plan and/or tactical waypoints. Tactical path definition can include holding patterns, search and/or rescue patterns, air refueling planning, air drop planning, formation flight, and/or lateral offset. Providing a navigation database can include managing the creation, designation, and/or storage of tactical waypoints. The navigation database can include a Digital Aeronautical Flight Information File (DAFIF) database and/or a user defined database. Additionally, the navigation database can provide appropriate navigational aids including but not limited to enroute, terminal, and/or approach procedures.

The tactical navigation module 542 can provide navigation sensor management, tactical navigation, and/or a best computed position. The navigation sensor management can include control of navigation sensors during tactical flight legs and/or auto tuning.

The tactical guidance module 544 can provide lateral guidance and/or vertical guidance. Lateral guidance can include beacon following, Personnel Locating Service (PLS), terrain following, terrain avoidance, and/or hover mode. Vertical guidance can include radar altitude select, low level navigation, auto re-route, air drop guidance, and/or air refueling guidance.

The tactical trajectory prediction module 546 can provide Computed Air Release Point/High Altitude Release Point (CARP/HARP) calculations, Time of Arrival Control (TOAC), fuel estimate calculations, and/or tactical performance.

The flight management system dual core manager 508 can include an integrity and data management module 532, a controls and display (C&D) module 534, a communication, navigation, and surveillance (CNS) manager 536, and an aircraft (A/C) systems manager 538.

In operation, the dual core flight management system 502 can transmit data to and/or receive data from the avionics systems 510. Data can be transmitted by the avionics systems 510 to the dual core flight management system 502 where it is received by the flight management system dual core manager 508 and then transmitted, in a modified form if appropriate, to one or more of the flight management system components (504, 506). A data message can also be transmitted by one or more of the flight management system components (504, 506) and received by the flight management system dual core manager 508, and the flight management system dual core manager 508 can transmit the data message, in a modified form if appropriate, to the avionics systems 510.

The dual core flight management system 502 can be a computer system that can be partitioned into temporally and spatially isolated partitions, in which the civil flight management system component 504, the tactical flight management system component 506, and the flight management system dual core manager 508 can each run in a temporally and spatially isolated partition as shown in FIG. 2.

FIG. 6 is a block diagram of an exemplary embodiment of a dual core flight management system including a flight management system dual core manager. The system 600 can include a dual core flight management system 602 that can include a civil flight management system component (or civil core flight management program component) 604, a tactical flight management system component (or tactical core flight management program component) 606, and a flight management system dual core manager 608. The dual core flight management system 602 can transmit data to and/or receive data from an avionics subsystem (or avionics systems) 610. The avionics systems 610 can include a second and/or redundant flight management system 612, a data transfer system 614, a multi-function display and multipurpose control display unit 616, a civil datalink and surveillance system 618, navigational sensor(s) 620, and an automatic flight control system 622.

The civil flight management system component 604 can include a flight planning module 624, a navigation module 626, a guidance module 628, and a trajectory and/or prediction module 630 corresponding to modules 524-530 described above and shown in FIG. 5. Similarly, the tactical flight management system component 606 can include a flight planning module 640, a navigation module 642, a guidance module 644, and a trajectory prediction module 646 corresponding to modules 540-546 described above and shown in FIG. 5.

The flight management system dual core manager 608 can include an integrity and data management manager 632, a controls and display (C&D) manager 634, a communication, navigation, and surveillance (CNS) manager 636, and an aircraft (A/C) systems manager 638. The flight management system dual core manager 608 can also include a system manager 652, a civil flight management system component manager 650, a tactical flight management system component manager 654, and a platform interface manager 656.

Figure 12:
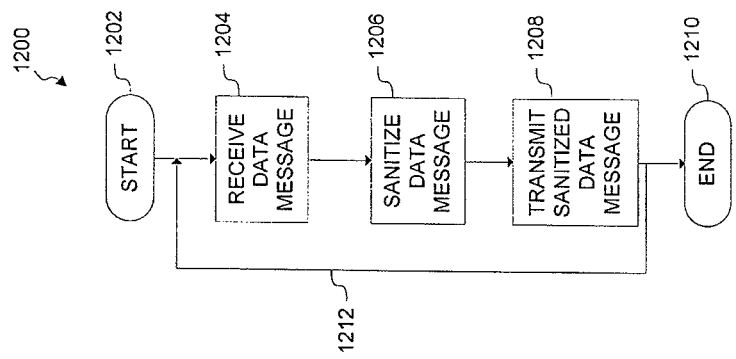
FIG. 12 is a flowchart showing an exemplary method for transmitting data between a dual core flight management system and an avionics system.
Figure 13:
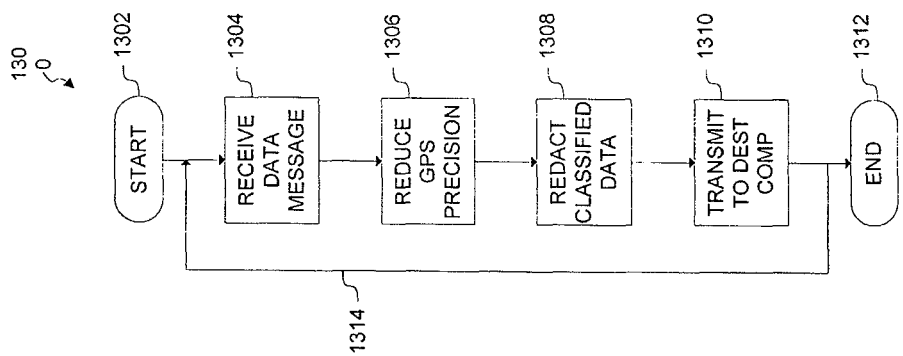
FIG. 13 is a flowchart showing an exemplary method for sanitizing flight management data.
Figure 14:
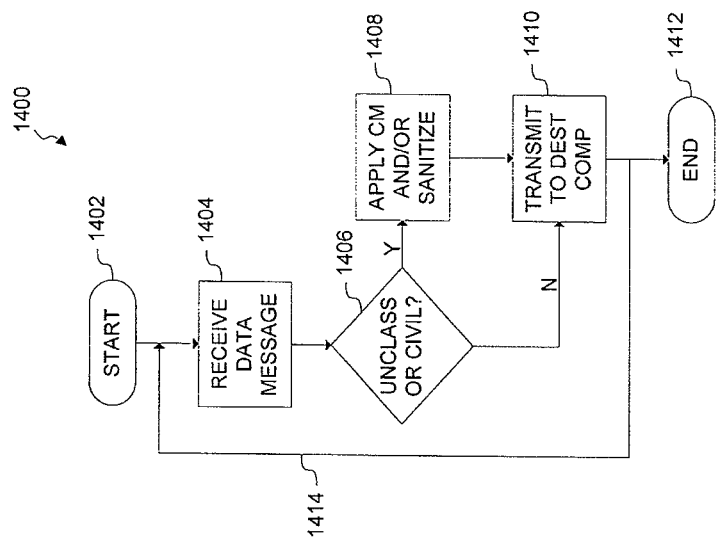
FIG. 14 is a flowchart showing an exemplary method for transmitting data between a multi core vehicle management system and a vehicle system.

In operation, the dual core flight management system 602 can transmit data to and/or receive data from the avionics systems 610. Data received by the dual core flight management system 602 from the avionics systems 610 can be received by the platform interface manager 656. The flight management system dual core manager 608 can apply any appropriate transformations to the data before the data and/or transformed data is transmitted to the appropriate flight system management component, as shown in FIGS. 12, 13, and 14.

Data transmitted by the civil flight management system component 604 can be received by the civil flight management system component manager 650 and can be transmitted the avionics systems 610 via the platform interface manager 656. The flight management system dual core manager 608 can apply any appropriate transformations to the data before the data and/or transformed data is transmitted to the avionics systems 610 via the platform interface manager 656, as shown in FIGS. 12, 13, and 14.

Data transmitted by the tactical flight management system component 606 can be received by the tactical flight management system component manager 654 and can be transmitted the avionics systems 610 via the platform interface manager 656. The flight management system dual core manager 608 can apply any appropriate transformations to the data before the data and/or transformed data is transmitted to avionics systems 610 via the platform interface manager 656, as shown in FIGS. 12, 13, and 14.

The dual core flight management system 602 can be a computer system that can be partitioned into temporally and spatially isolated partitions, in which the civil flight management system component 604, the tactical flight management system component 606, and the flight management system dual core manager 608 can each run in a temporally and spatially isolated partition as shown in FIG. 2 and described above.

Figure 7:
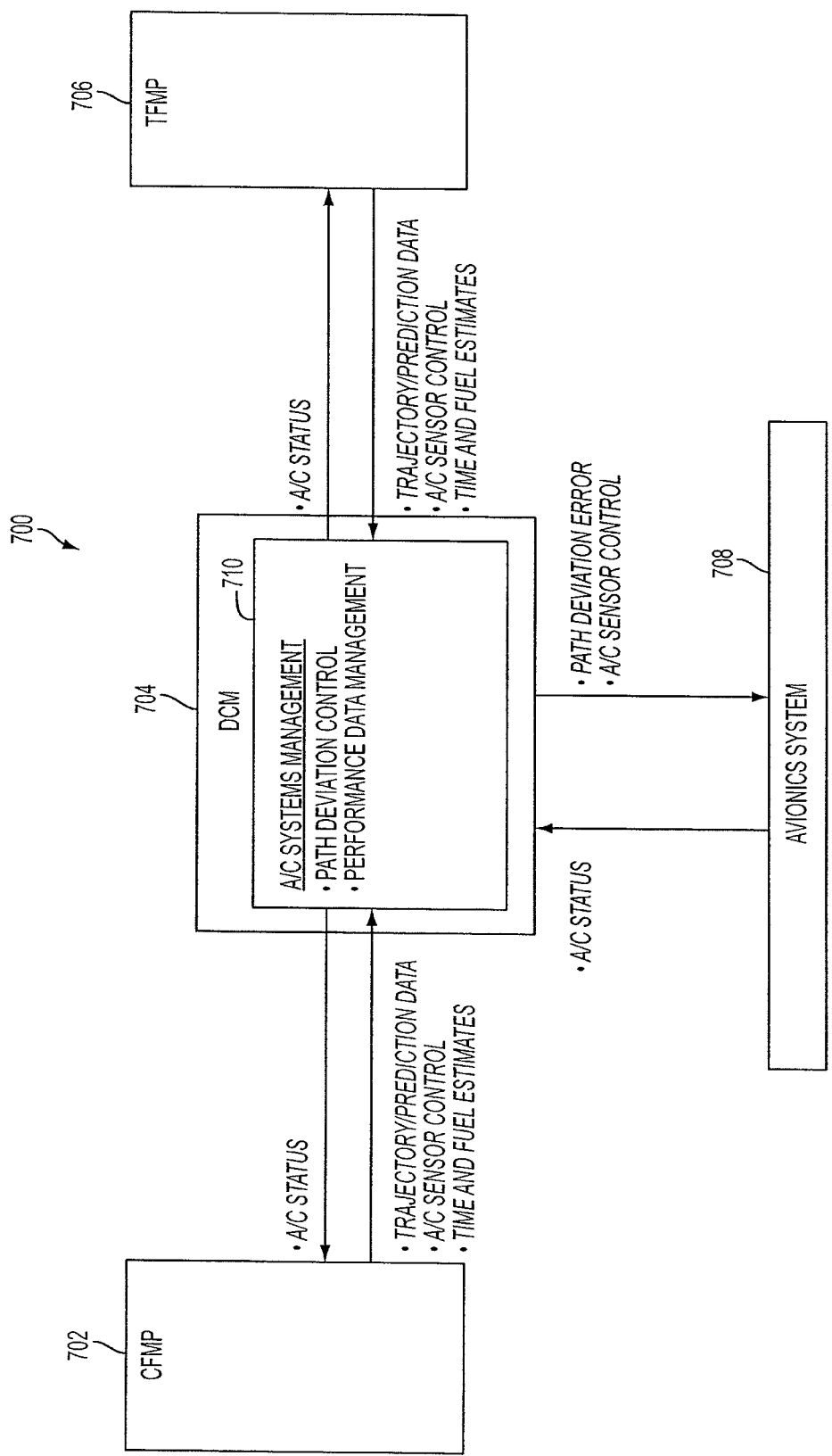
FIG. 7 is a block diagram showing an exemplary embodiment of a flight management system dual core manager A/C (Aircraft) systems manager.

FIG. 7 is a block diagram showing an exemplary embodiment of a flight management system dual core manager AIC (Aircraft) systems manager. System 700 can include a flight management system dual core manager 704 that includes an aircraft systems manager 710. The flight management system dual core manager 704 can receive data from and transmit data to a civil flight management system component 702 and a tactical flight management system component 706. The flight management system dual core manager 704 can also receive data from and transmit data to an avionics system 708.

In operation, the aircraft systems manager 710 can provide path deviation control and/or performance data management.

The aircraft systems manager 710 can receive aircraft status data transmitted by the avionics system 708 and transmit aircraft status data to the civil flight management system component 702 and the tactical flight management system component 706.

The aircraft systems manager 710 can receive trajectory prediction data, aircraft sensor control data, and/or time and/or fuel estimate data transmitted by the civil flight management system component 702 and the tactical flight management system component 706. The aircraft systems manager 710 can transmit path deviation error data and/or aircraft sensor control data to the avionics system 708.

Figure 8:
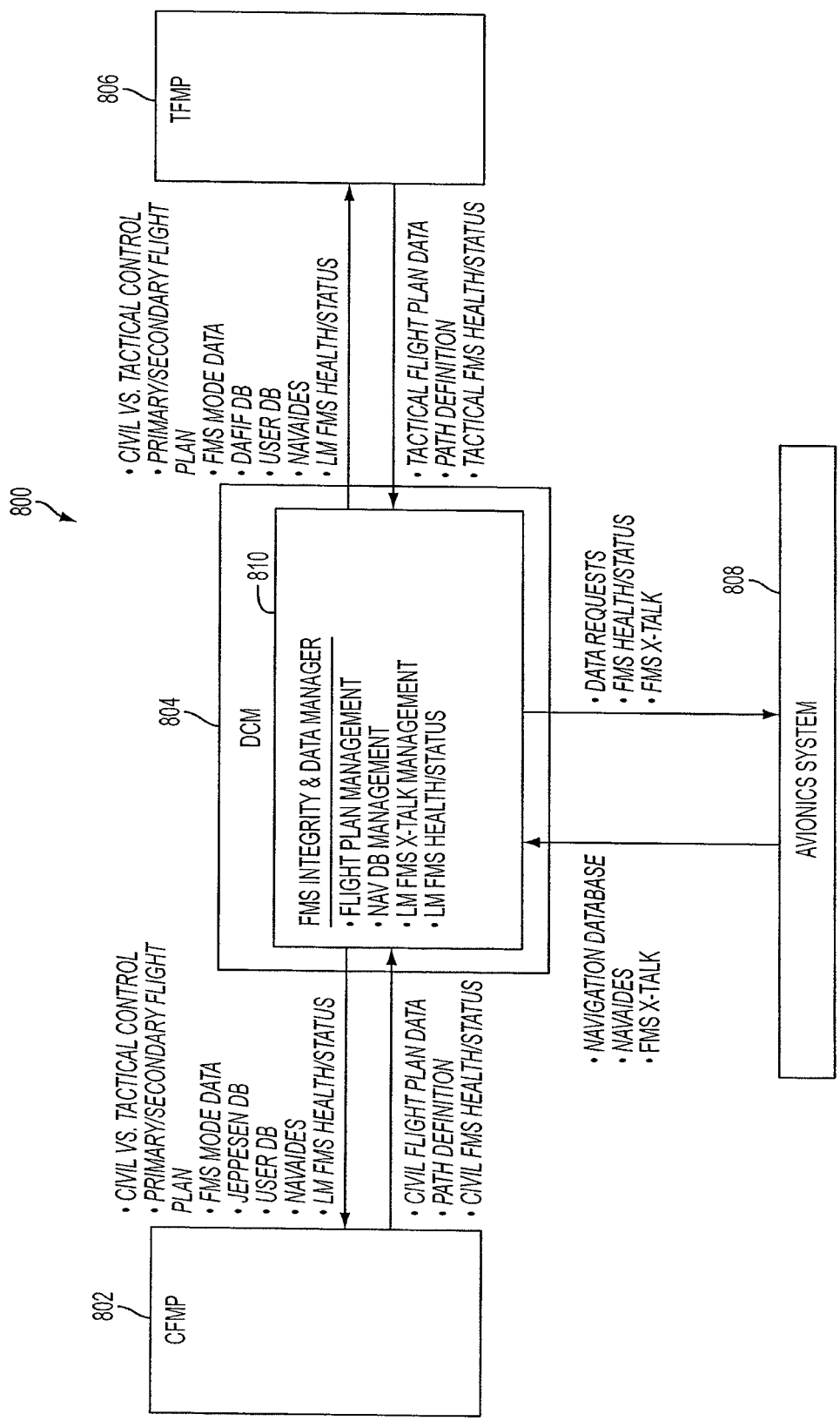
FIG. 8 is a block diagram showing an exemplary embodiment of a flight management system dual core manager integrity and data manager.

FIG. 8 is a block diagram showing an exemplary embodiment of a flight management system dual core manager integrity and data manager. System 800 can include a flight management system dual core manager 804 that includes flight management system integrity and data manager 810. The flight management system dual core manager 804 can receive data from and transmit data to a civil flight management system component 802 and a tactical flight management system component 806. The flight management system dual core manager 804 can also receive data from and transmit data to an avionics system 808.

In operation, the flight management system integrity and data manager 810 can provide flight plan management, navigation database management, flight management system X-Talk management, and/or flight management system health/status management. The flight management system integrity and data manager 810 can receive navigation database data, navaids, and/or flight management system X-Talk data from and transmit data requests, flight management system health/status data, and/or flight management system X-Talk data to the avionics system 808.

The flight management system integrity and data manager 810 can transmit civil versus tactical control data, primary flight plan data, secondary flight plan data, flight management system mode data, Jeppesen database data, user database data, navaids data, and/or flight management system health/status data that can be received by the civil flight management system component 802. The civil flight management system component 802 can transmit civil flight plan data, path definition data, and/or civil flight management system health/status data that can be received by the flight management system integrity and data manager 810.

The flight management system integrity and data manager 810 can transmit civil versus tactical control data, primary flight plan data, secondary flight plan data, flight management system mode data, Digital Aeronautical Flight Information File (DAFIF) database data, user database data, navaids data, and/or flight management system health/status data that can be received by the civil flight management system component 802. The tactical flight management system component 806 can transmit tactical flight plan data, path definition data, and/or tactical flight management system health/status data that can be received by the flight management system integrity and data manager 810.

Figure 9:
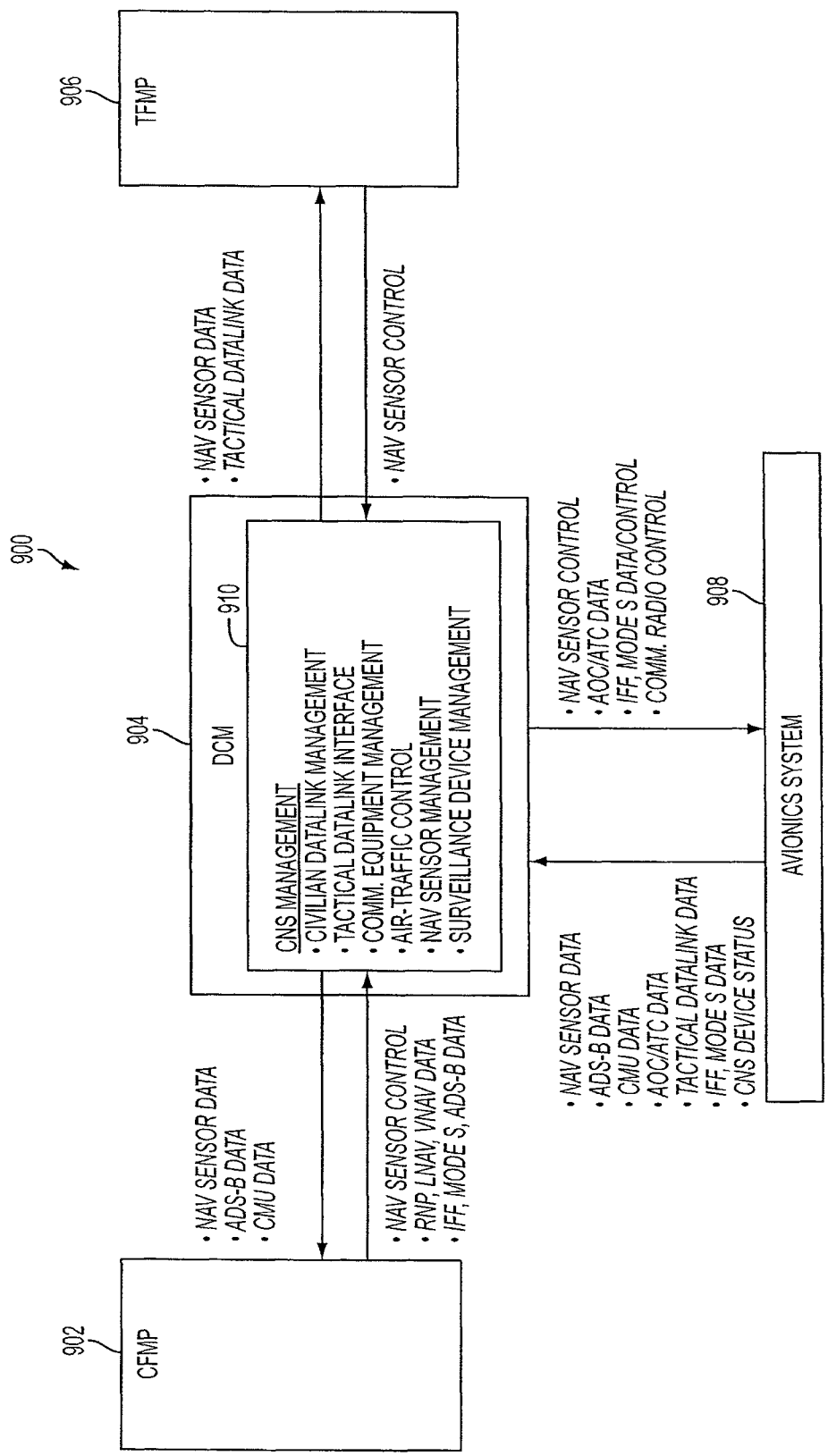
FIG. 9 is a block diagram showing an exemplary embodiment of a flight management system dual core manager Communication, Navigation, Surveillance (CNS) manager.

FIG. 9 is a block diagram showing an exemplary embodiment of a flight management system dual core manager Communication, Navigation, Surveillance (CNS) manager. System 900 can include a flight management system dual core manager 904 that includes a Communication, Navigation, Surveillance (CNS) manager 910. The flight management system dual core manager 904 can receive data from and transmit data to a civil flight management system component 902 and a tactical flight management system component 906. The flight management system dual core manager 904 can also receive data from and transmit data to an avionics system 908.

In operation, the Communication, Navigation, Surveillance (CNS) manager 910 can provide civilian datalink management, tactical datalink management, communications equipment management, air-traffic control, navigation sensor management, and/or surveillance device management.

The Communication, Navigation, Surveillance (CNS) manager 910 can transmit navigation sensor control data, Airline Operational Control/Air Traffic Control (AOC/ATC) data, Identification Friend Foe (IFF) data, Mode-S data, and/or communication radio control data that can be received by the avionics system 908. The avionics system 908 can transmit navigation sensor data, Automatic Dependent Surveillance-Broadcast (ADS-B) data, Communications Management Unit (CMU) data, AOC/ATC data, tactical datalink data, Identification Friend Foe data, Mode-S data, and/or CNS device status data that can be received by the Communication, Navigation, Surveillance (CNS) manager 910.

The Communication, Navigation, Surveillance (CNS) manager 910 can transmit navigation sensor data, ADS-B data, and/or CMU data that can be received by the civil flight management system component 902. The civil flight management system component 902 can transmit navigation sensor control data, Required Navigation Performance (RNP) data, Lateral Navigation (LNAV) data, Vertical Navigation (VNAV) data, Identification Friend Foe (IFF) data, Mode-S data, and/or ADS-B data that can be received by the Communication, Navigation, Surveillance (CNS) manager 910.

The Communication, Navigation, Surveillance (CNS) manager 910 can transmit navigation sensor data and/or tactical datalink data that can be received by the tactical flight management system component 906. The tactical flight management system component 906 can transmit navigation sensor control that can be received by the Communication, Navigation, Surveillance (CNS) manager 910.

Figure 10:
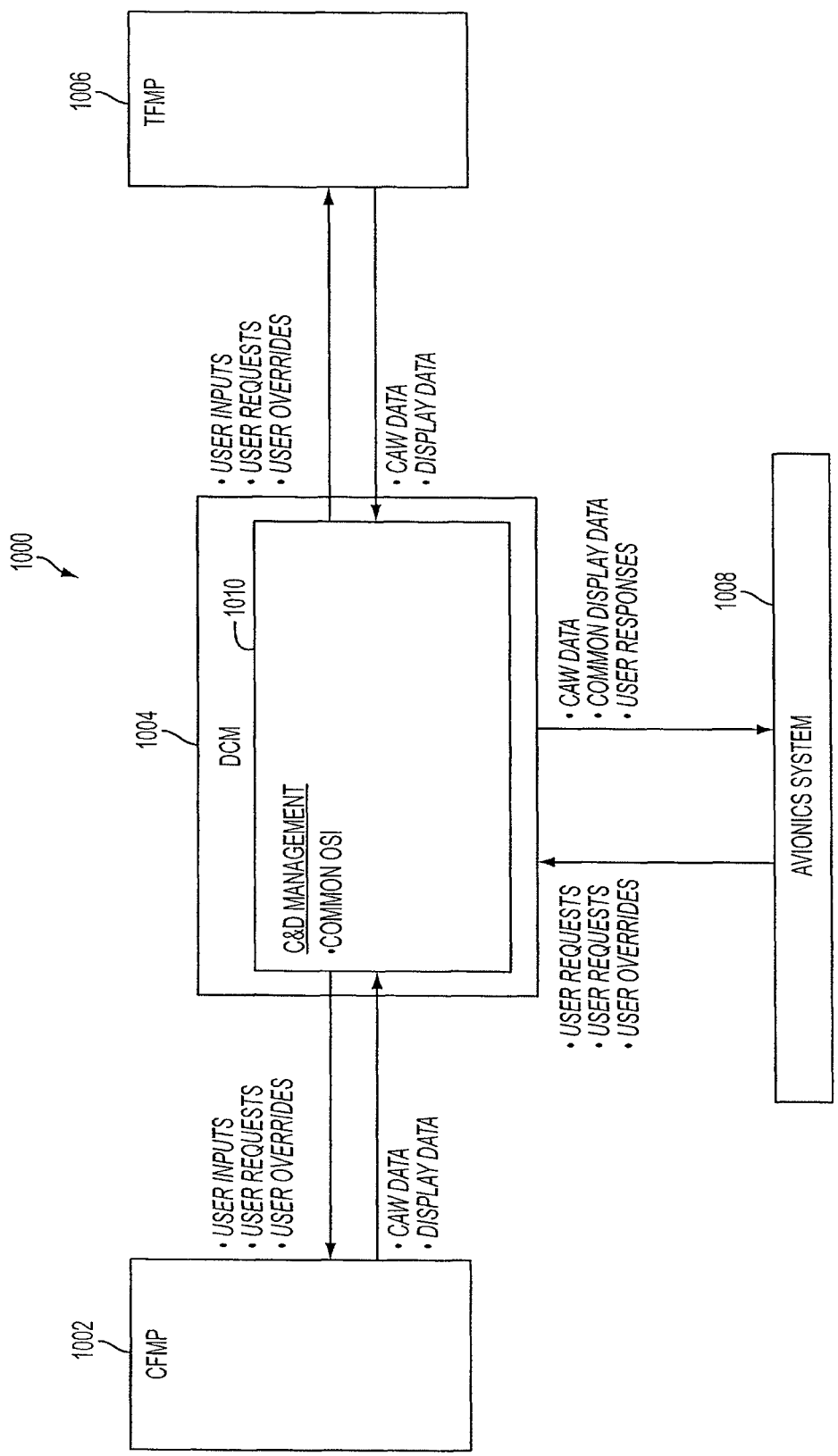
FIG. 10 is a block diagram showing an exemplary embodiment of a flight management system dual core manager Controls and Display (C&D) manager.

FIG. 10 is a block diagram showing an exemplary embodiment of a flight management system dual core manager Controls and Display (C&D) manager. System 1000 can include a flight management system dual core manager 1004 that includes a controls and display (C&D) manager 1010. The flight management system dual core manager 1004 can receive data from and transmit data to a civil flight management system component 1002 and a tactical flight management system component 1006. The flight management system dual core manager 1004 can also receive data from and transmit data to an avionics system 1008.

In operation, the controls and display (C&D) manager 1010 provides a common on screen interface (OSI). The controls and display (C&D) manager 1010 can transmit CAW data, common display data, and/or user response data that can be received by the avionics system 1008. The avionics system 1008 can transmit user inputs, user requests, and/or user overrides that can be received by the controls and display (C&D) manager 1010.

The civil flight management system component 1002 can transmit CAW data and/or display data that can be received by the controls and display (C&D) manager 1010. The controls and display (C&D) manager 1010 can transmit user inputs, user requests, and/or user overrides that can be received by the civil flight management system component 1002.

The tactical flight management system component 1006 can transmit CAW data and/or display data that can be received by the controls and display (C&D) manager 1010. The controls and display (C&D) manager 1010 can transmit user inputs, user requests, and/or user overrides that can be received by the tactical flight management system component 1006.

Figure 11:
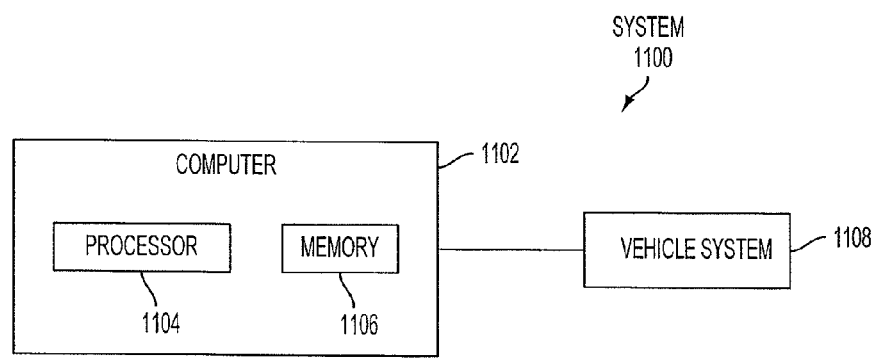
FIG. 11 is a block diagram of an exemplary embodiment of a multi core flight management system.

FIG. 11 is a block diagram of an exemplary embodiment of a multi core vehicle management system. System 1100 can include a computer 1102 that can include a processor 1104 and a memory 1106. The computer 1102 can transmit data to and/or receive data from a vehicle system, or vehicle subsystem, 1108.

In operation, the processor 1104 will execute instructions stored on the memory 1106 that cause the computer 1102 to transmit data to and/or receive data from the vehicle system 1108 according to the processes shown in FIG. 12 through 19.

It will be appreciated that the vehicle system 1108 may be attached to the system using any connection type now known or later developed.

The system 1100 can be a dual core flight management system as shown in FIGS. 2 and 6 and described above. The computer 1102 can be partitioned, as shown in FIG. 2, so that the civil flight management system component 210 and the tactical flight management system component 214 can be run in separate partitions and thereby can be temporally isolated on the processor 1104 and spatially isolated on the memory 1106.

It will be appreciated that the computer 1102 can have more than one processor.

FIG. 12 is a flowchart showing an exemplary method for transmitting data between a dual core flight management system and an avionics system 1200. Processing begins at 1202 and continues to 1204.

At 1204, a data message having a destination component is received. The data message can be received by the platform interface manager 656, as shown in FIG. 6. The destination component can be the avionics subsystem 610, an avionics subsystem component (612-622), and/or a flight management system component (604, 606). For example, the platform interface manager 656 can receive a data message originating from the civil flight management system component 604 or the tactical flight management system component 606 with a destination component set to the avionics subsystem 610. Processing continues to 1206.

At 1206, the data message is sanitized based on the sender of the data message and the destination component. Sanitizing the data message can be performed according to the processes shown in FIGS. 13 and 14. For example, sanitizing can include reducing the precision of geographic location data and/or the redaction of classified data, as described below and shown in FIG. 13. Processing continues to 1208.

At 1208, the sanitized data message is transmitted to the destination component. Processing continues to 1210, where processing ends.

It will be appreciated that operations 1204-1208 may be repeated in whole or in part (an example of which is indicated by line 1212) to receive a response data message from the destination component, sanitize the response data message, and transmit the sanitized response data message to the sender of the original data message.

It will also be appreciated that operations 1204-1208 may be repeated in whole or in part (an example of which is indicated by line 1212) to maintain current (regularly or continuously updated) data transmissions.

FIG. 13 is a flowchart showing an exemplary method for sanitizing flight management data 1300. Processing begins at 1302 and continues to 1304.

At 1304, a data message having a destination component is received. The data message can be received by the platform interface manager 656, as shown in FIG. 6. The destination component can be the avionics subsystem 610, an avionics subsystem component (612-622), and/or a flight management system component (604, 606). For example, the platform interface manager 656 can receive a data message originating from the civil flight management system component 604 or the tactical flight management system component 606 with a destination component set to the avionics subsystem 610. Processing continues to 1306.

At 1306, the precision of geographic location data (GPS data) contained within the data message is reduced to an unclassified resolution. For example, a data message having a destination component set to the civil flight management system component 604 can have sensitive and/or classified GPS data converted to a precision that is appropriate for transmission to an unclassified and/or civil flight management system component. In another example, a data message having a destination component set to an unclassified avionics system component can have sensitive and/or classified GPS data converted to a precision that is appropriate for transmission to an unclassified avionics system component. Processing continues to 1308.

At 1308, any remaining classified data contained within the data message is redacted. Redacting can include zeroing out, truncating, populating the classified areas of the data with random data, or any other method to remove the classified data from the data message. Processing continues to 1310.

At 1310, the data message is transmitted to the destination component. Processing continues to 1312, where processing ends.

It will also be appreciated that operations 1304-1308 may be repeated in whole or in part (an example of which is indicated by line 1312) to maintain current (regularly or continuously updated) data transmissions.

FIG. 14 is a flowchart showing an exemplary method for transmitting data between a multi core vehicle management system and a vehicle system 1400. Processing begins at 1402 and continues to 1404.

At 1404, a data message is received. The data message can be received by the platform interface manager 656, as shown in FIG. 6. The data message can have a destination component indicating the component to which the data message is to be transmitted. The destination component can be part of the data message, determined by the content of the data message, determined by the method, service, or communication channel through which the data message was received, and/or determined by any other means associating the data message with one or more destination components. The destination component can be a vehicle subsystem 306 and/or a vehicle subsystem component (e.g., 612-622), or one of a plurality of flight management system components (308, 310), as shown in FIG. 3. For example, the platform interface manager 656 can receive a data message originating from one of the vehicle management system components (308, 310) with a corresponding destination component being the vehicle subsystem 306. Processing continues to 1406.

At 1406, a determination is made based on the classification level and/or type of the destination component. If the destination component is unclassified or civil, then processing can continue to 1408, otherwise processing can continue to 1410. For example, the destination component may be an unclassified transponder or an unclassified vehicle management system component, e.g. a civil flight management system component.

At 1408, the data message is sanitized and/or countermeasures are applied. Sanitizing and/or applying countermeasures to the data message can be performed according to the processes shown in FIGS. 13, 14, 15, 16, 17, and 18. Processing continues to 1410.

At 1410, the sanitized and/or filtered data message is transmitted to the destination component. Processing continues to 1412, where processing ends.

It will be appreciated that operations 1404-1410 may be repeated in whole or in part (an example of which is indicated by line 1414) to maintain current (regularly or continuously updated) data transmissions.

Figure 15:
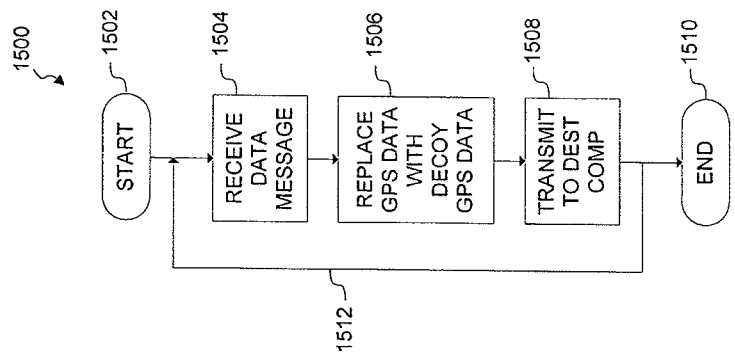
FIG. 15 is a flowchart showing an exemplary method for performing countermeasure transmission of decoy vehicle data.

FIG. 15 is a flowchart showing an exemplary method for performing countermeasure transmission of decoy vehicle data 1500. Processing begins at 1502 and continues to 1504.

At 1504, a data message is received. The data message can be received by the platform interface manager 656, as shown in FIG. 6. The data message can have a destination component indicating the component to which the data message is to be transmitted. The destination component can be part of the data message, determined by the content of the data message, determined by the method, service, or communication channel through which the data message was received, and/or determined by any other means associating the data message with one or more destination components. For example, the platform interface manager 656 can receive a data message originating from the civil flight management system component 604 with a destination component set to a civil transponder in the avionics subsystem 610. For example, the platform interface manager 656 can receive a data message originating from the tactical flight management system component 604 with a destination component set to an unclassified transponder in the avionics subsystem 610. Processing continues to 1506.

At 1506, portions of the data message that contain geographic position data are replaced with decoy geographic position data. For example, data messages created by the civil flight management system component can contain the aircraft's past and/or current and/or planned future geographic location, such as GPS coordinates, and this geographic location data can be replaced with decoy geographic location data so that the aircraft's true past and/or current and/or planned future geographic location is not transmitted via the civil transponder. For example, data messages created by the tactical flight management system component can contain the aircraft's past and/or current and/or planned future geographic location, such as GPS data, and this geographic location data can be replaced with decoy geographic location data so that the aircraft's true past and/or current and/or planned future geographic location is not transmitted via an unclassified transponder. Processing continues to 1508.

At 1508, the data message containing the decoy vehicle identifier data is transmitted. For example, the data message can be transmitted via a civil transponder and/or an unclassified transponder. Processing continues to 1510, where processing ends.

It will be appreciated that operations 1504-1508 may be repeated in whole or in part (an example of which is indicated by line 1512) to maintain current (regularly or continuously updated) decoy data transmissions.

Figure 16:
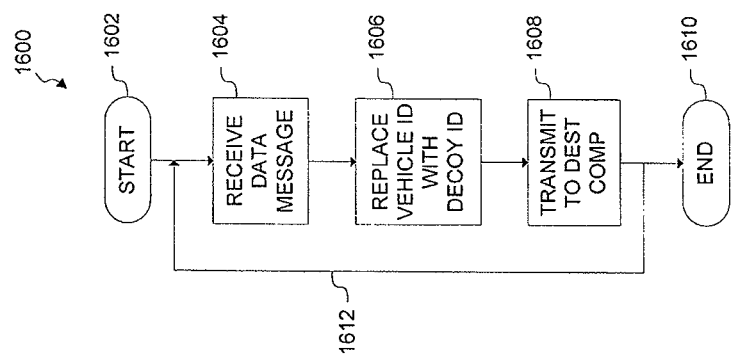
FIG. 16 is a flowchart showing an exemplary method for performing countermeasure transmission of decoy vehicle data.

FIG. 16 is a flowchart showing an exemplary method for performing countermeasure transmission of decoy vehicle data 1600. Processing begins at 1602 and continues to 1604.

At 1604, a data message is received. The data message can be received by the platform interface manager 656, as shown in FIG. 6. The data message can have a destination component indicating the component to which the data message is to be transmitted. The destination component can be part of the data message, determined by the content of the data message, determined by the method, service, or communication channel through which the data message was received, and/or determined by any other means associating the data message with one or more destination components. For example, the platform interface manager 656 can receive a data message originating from the civil flight management system component 604 with a destination component set to a civil transponder in the avionics subsystem 610. For example, the platform interface manager 656 can receive a data message originating from the tactical flight management system component 604 with a destination component set to an unclassified transponder in the avionics subsystem 610. Processing continues to 1606.

At 1606, portions of the data message that contain a vehicle identifier are replaced with a decoy vehicle identifier. For example, an aircraft identifier, N12345, can be included within data messages created by the civil flight management system component and the aircraft identifier can be replaced with a decoy identifier so that the true identifier is not transmitted via the civil transponder. Processing continues to 1608.

At 1608, the data message containing the decoy vehicle identifier data is transmitted. For example, the data message can be transmitted via a civil transponder and/or an unclassified transponder. Processing continues to 1610, where processing ends.

It will be appreciated that operations 1604-1608 may be repeated in whole or in part (an example of which is indicated by line 1612) to maintain current (regularly or continuously updated) data transmissions.

Figure 17:
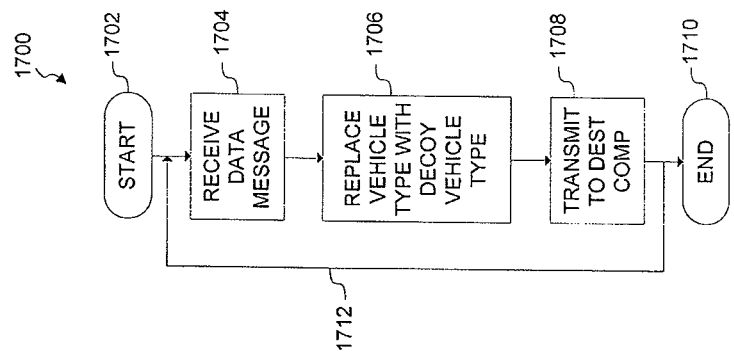
FIG. 17 is a flowchart showing an exemplary method for performing countermeasure transmission of decoy vehicle data.

FIG. 17 is a flowchart showing an exemplary method for performing countermeasure transmission of decoy vehicle data 1700. Processing begins at 1702 and continues to 1704.

At 1704, a data message is received. The data message can be received by the platform interface manager 656, as shown in FIG. 6. The data message can have a destination component indicating the component to which the data message is to be transmitted. The destination component can be part of the data message, determined by the content of the data message, determined by the method, service, or communication channel through which the data message was received, and/or determined by any other means associating the data message with one or more destination components. For example, the platform interface manager 656 can receive a data message originating from the civil flight management system component 604 with a destination component set to a civil transponder in the avionics subsystem 610. For example, the platform interface manager 656 can receive a data message originating from the tactical flight management system component 604 with a destination component set to an unclassified transponder in the avionics subsystem 610. Processing continues to 1706.

At 1706, portions of the data message that contain a vehicle type are replaced with a decoy vehicle type. For example, an aircraft type, such as F16, can be included within data messages created by the civil flight management system component and the aircraft type can be replaced with a decoy identifier, such as A30B, so that the true type is not transmitted via the civil transponder. Processing continues to 1608.

At 1708, the data message containing the decoy vehicle type data is transmitted. For example, the data message can be transmitted via a civil transponder and/or an unclassified transponder. Processing continues to 1710, where processing ends.

It will be appreciated that operations 1704-1708 may be repeated in whole or in part (an example of which is indicated by line 1712) to maintain current (regularly or continuously updated) data transmissions.

Figure 18:
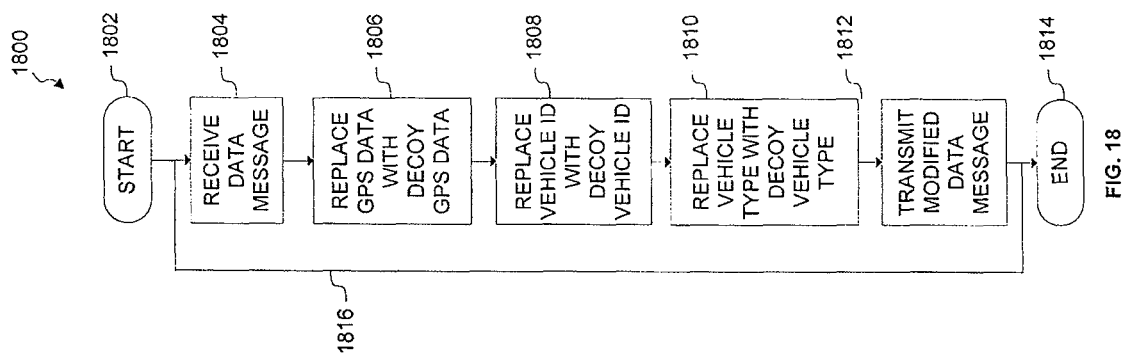
FIG. 18 is a flowchart showing an exemplary method for intercepting civil flight management data and transforming the data to include decoy identification data prior to transmission via a civil transponder.

FIG. 18 is a flowchart showing an exemplary method for intercepting civil flight management data and transforming the data to include decoy identification data prior to transmission via a civil transponder 1800. Processing begins at 1802 and continues to 1804.

At 1804, a data message is received. The data message can be a flight management data message that can be transmitted by the civil flight management system component 604 and received by the platform interface manager 656, as shown in FIG. 6. The data message can have a destination component indicating the component to which the data message is to be transmitted. The destination component can be part of the data message, determined by the content of the data message, determined by the method, service, or communication channel through which the data message was received, and/or determined by any other means associating the data message with one or more destination components. The destination component can be an avionics subsystem 610 and/or a civil transponder, as shown in FIG. 6. For example, the platform interface manager 656 can receive a data message originating from the civil flight management system component 604 with a destination component set to a civil transponder in the avionics subsystem 610. For example, the platform interface manager 656 can receive a data message originating from the tactical flight management system component 604 with a destination component set to an unclassified transponder in the avionics subsystem 610. Processing continues to 1806.

At 1806, geographic position data, such as GPS data, contained within the data message is replaced with decoy geographic position data as described at 1506. Processing continues to 1808.

At 1808, any vehicle identifiers contained within the data message are replaced with decoy vehicle identifiers as described at 1606. Processing continues to 1810.

At 1810, any vehicle type designator contained within the data massage is replaced with a decoy vehicle type designator as described at 1706. Processing continues to 1812.

At 1812, the data message containing the decoy data is transmitted. For example, the data message can be transmitted via a civil transponder and/or an unclassified transponder. Processing continues to 1814, where processing ends.

It will be appreciated that operations 1804-1812 may be repeated in whole or in part (an example of which is indicated by line 1816) to maintain current (regularly or continuously updated) data transmissions.

Figure 19:
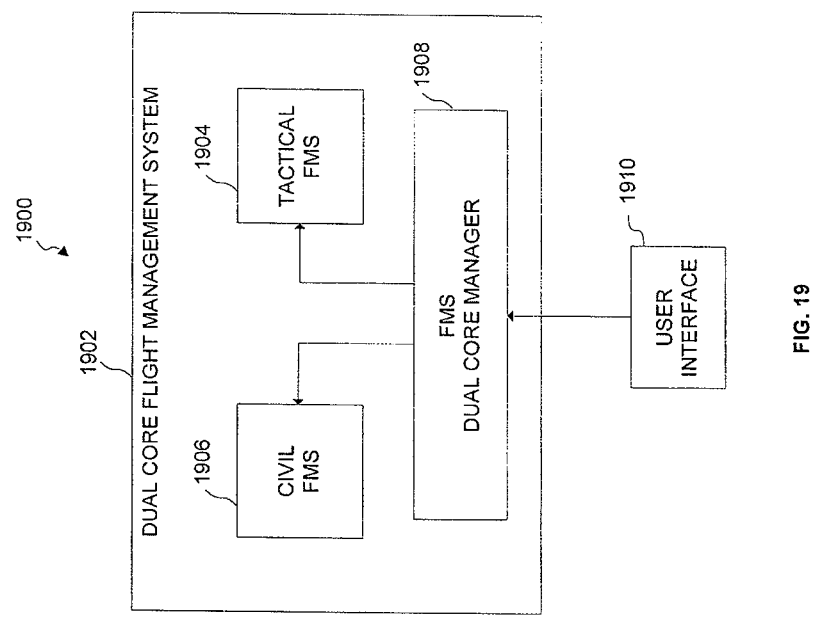
FIG. 19 is a block diagram of an exemplary embodiment of a dual core flight management system and unified user interface.
Figure 20:
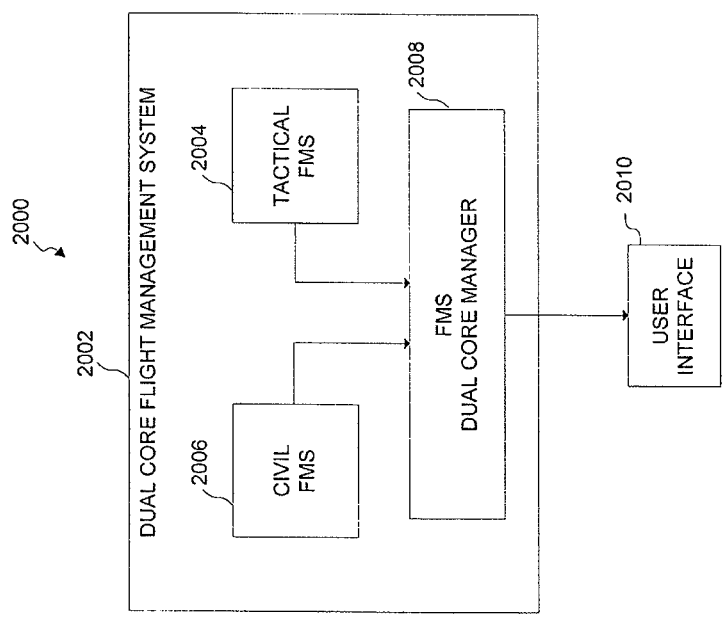
FIG. 20 is a block diagram of an exemplary embodiment of a dual core flight management system and unified user interface.

FIG. 19 is a block diagram of an exemplary embodiment of a dual core flight management system and unified user interface. System 1900 can include a dual core flight management system 1902 having a civil flight management system component 1906, a tactical flight management system component 1904, and a flight management system dual core manager 1908. The dual core flight management system 1902 can transmit data to (as shown in FIG. 20) and/or receive data from a flight management system user interface device 1910. The flight management system user interface device 1910 can be accessed via the avionics system, or avionics subsystem, as shown in FIG. 6.

Figure 21:
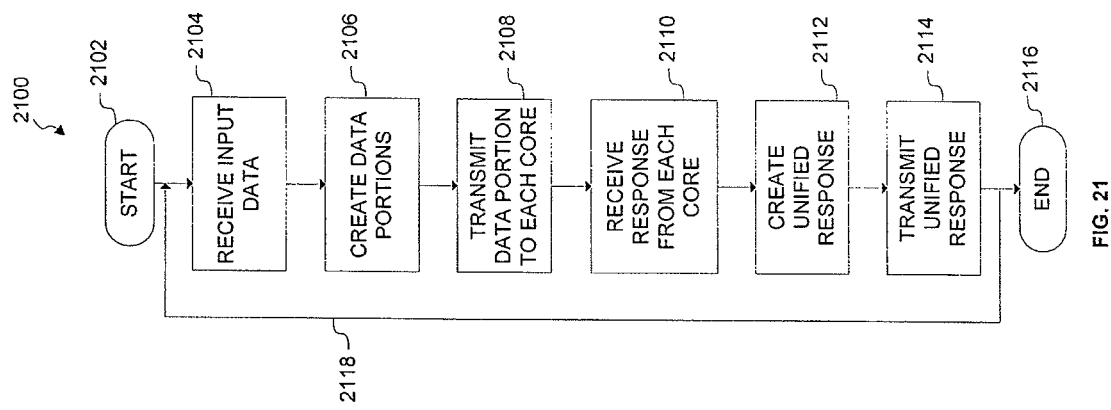
FIG. 21 is a flowchart showing an exemplary method for receiving multi core flight management input data from a user interface and providing a unified flight management response.

In operation, the dual core flight management system 1902 can transmit data to and/or receive data from the flight management system user interface device 1910 according to the process shown in FIG. 21. The flight management system dual core manager 1908 can receive flight management system input data, or a dataset, from the flight management system user interface device 1910. Based on the flight management system input data, the dual core flight management system dual core manager 1908 can create a civil flight management system input data portion and a tactical flight management system input data portion. The dual core flight management system dual core manager 1908 can transmit the civil flight management system input data portion and the tactical flight management system input data portion to the civil flight management system component 1906 and the tactical flight management system component 1904, respectively.

It will be appreciated that the flight management system user interface device 1910 can be any type of user interface. It will also be appreciated that the flight management system user interface device 1910 and the flight management system user interface device 2010 can be the same or different devices.

FIG. 20 is a block diagram of an exemplary embodiment of a dual core flight management system and unified user interface. System 2000 can include a dual core flight management system 2002 having a civil flight management system component 2006, a tactical flight management system component 2004, and a flight management system dual core manager 2008. The dual core flight management system 2002 can transmit data to and/or receive data from (as shown in FIG. 19) a flight management system user interface device 2010. The flight management system user interface device 2010 can be accessed via the avionics system, or avionics subsystem, as shown in FIG. 6.

In operation, the dual core flight management system 2002 can transmit data to and/or receive data from the flight management system user interface device 2010 according to the process shown in FIG. 21. The flight management system dual core manager 2008 can receive a civil flight management system component response from the civil flight management system component 2006. The civil flight management system component response can contain a response to the civil flight management system input data portion received by the civil flight management system component as shown in FIG. 19. The flight management system dual core manager 2008 can also receive a tactical flight management system component response from the tactical flight management system component 2004. The tactical flight management system component response can contain a response to the tactical flight management system input data portion received by the tactical flight management system component as shown in FIG. 19. The flight management system dual core manager 2008 can, according to the process shown in FIG. 21 and described in FIGS. 22 and 23, create a unified flight management system response message consolidating and/or merging the civil flight management system component response and the tactical flight management system component response. The flight management system dual core manager 2008 can transmit the unified flight management system response message to the flight management system user interface device 2010.

It will be appreciated that the flight management system user interface device 1910 can be any type of user interface. It will also be appreciated that the flight management system user interface device 1910 and the flight management system user interface device 2010 can be the same or different devices.

FIG. 21 is a flowchart showing an exemplary method for receiving multi core flight management input data from a user interface and providing a unified flight management response. Processing begins at 2102 and continues to 2104.

At 2104, a flight management system input data message (or dataset) is received. The data message can be received by the platform interface manager 656, as shown in FIG. 6. The data message can be received from the flight management system user interface device 1910, as shown in FIG. 19, and the flight management system user interface device 1910 can be one of the avionics subsystem components (612-622), as shown in FIG. 6. Processing continues to 2106.

At 2106, one or more flight management system input data portions is created, each data portion having a destination flight management system component, based on the flight management system input dataset. The flight management system input data portions can be created based on one or more qualifiers, such as but not limited to waypoint type (civil or tactical), tactical flight plan entry waypoint, and/or tactical flight plan exit waypoint. For example, in the dual core flight management system 1900 show in FIG. 19, a civil flight management system input data portion and a tactical flight management input data portion are created based on the flight management system input dataset having destination flight management system components set to the civil flight management system component 1906 and the tactical flight management system component 1904, respectively.

For example, the flight management input dataset can contain an ordered list of civil and tactical waypoints and the civil flight management input data portion can be populated with the civil waypoints whereas the tactical flight management input data portion can be populated with the tactical waypoints.

In another example, the flight management system input dataset can include an ordered list of waypoints, one of which selected as a tactical flight plan entry waypoint and one of which selected as a tactical flight plan exit waypoint. Continuing this example, the civil flight management system input data portion can be populated with the ordered list of waypoints excluding those waypoints ordered between the tactical flight plan entry waypoint and tactical flight plan exit waypoint, and the tactical flight management system input data portion can be populated with the ordered list of waypoints excluding those waypoints ordered before the tactical flight plan entry waypoint and excluding those waypoints ordered after the tactical flight plan exit waypoint. Processing continues to 2108.

At 2108, each flight management system input data portion is transmitted to the corresponding flight management system component. For example, the civil flight management system input data portion can be transmitted to the civil flight management system component 1906, as shown in FIG. 19. Processing continues to 2110.

At 2110, flight management system component response messages are received. The messages can be received by the flight management system dual core manager 2008 from one or more flight management system components, such as the civil flight management system component 2006 and/or the tactical flight management system component 2004, as shown in FIG. 20. Processing continues to 2112.

Figure 23:
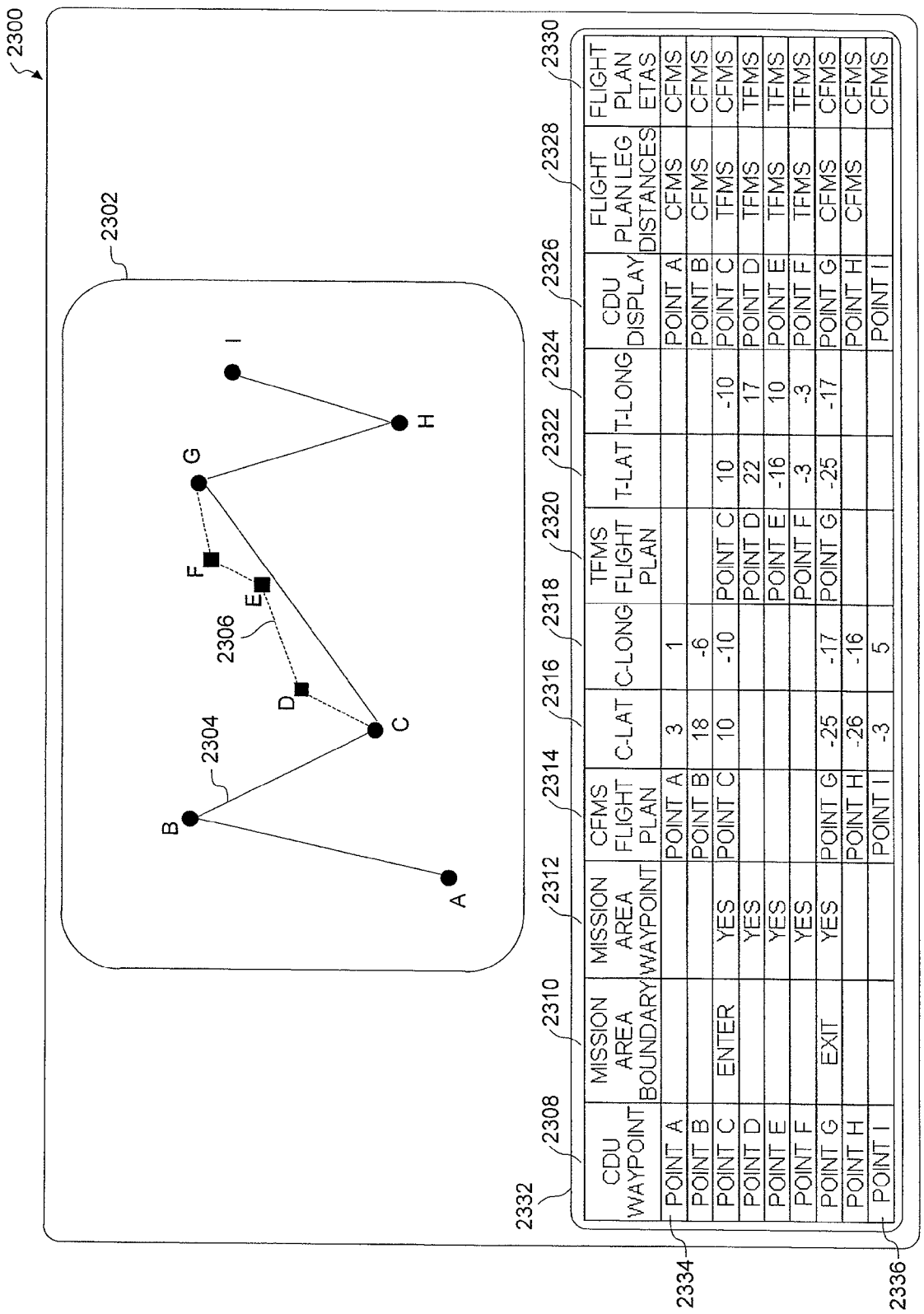
FIG. 23 is a unified user interface system showing an exemplary display of a unified flight plan containing civil and tactical waypoints.

At 2112, a unified flight management system response message is created based on the flight management system component response messages received. For example, a unified flight management system response message can be created by consolidating and/or merging the civil flight plan contained within the civil flight management system response received from the civil flight management system component and the tactical flight plan contained within the tactical flight management system response received from the tactical flight management system component, as shown in FIG. 23. Consolidating and/or merging the civil flight plan and tactical flight plan can include creating a unified flight plan containing the waypoints of both the civil and tactical flight plans and ordering the waypoints according to their ordering prior to being split into flight management system input data portions. Processing continues to 2114.

At 2114, the unified flight management system response message is transmitted to a flight management user interface device, as shown in FIG. 20. Processing continues to 2116, where processing ends.

It will also be appreciated that operations 2104-2114 may be repeated in whole or in part (an example of which is indicated by line 2118) to maintain current (regularly or continuously updated) user interface transmissions.

Figure 22:
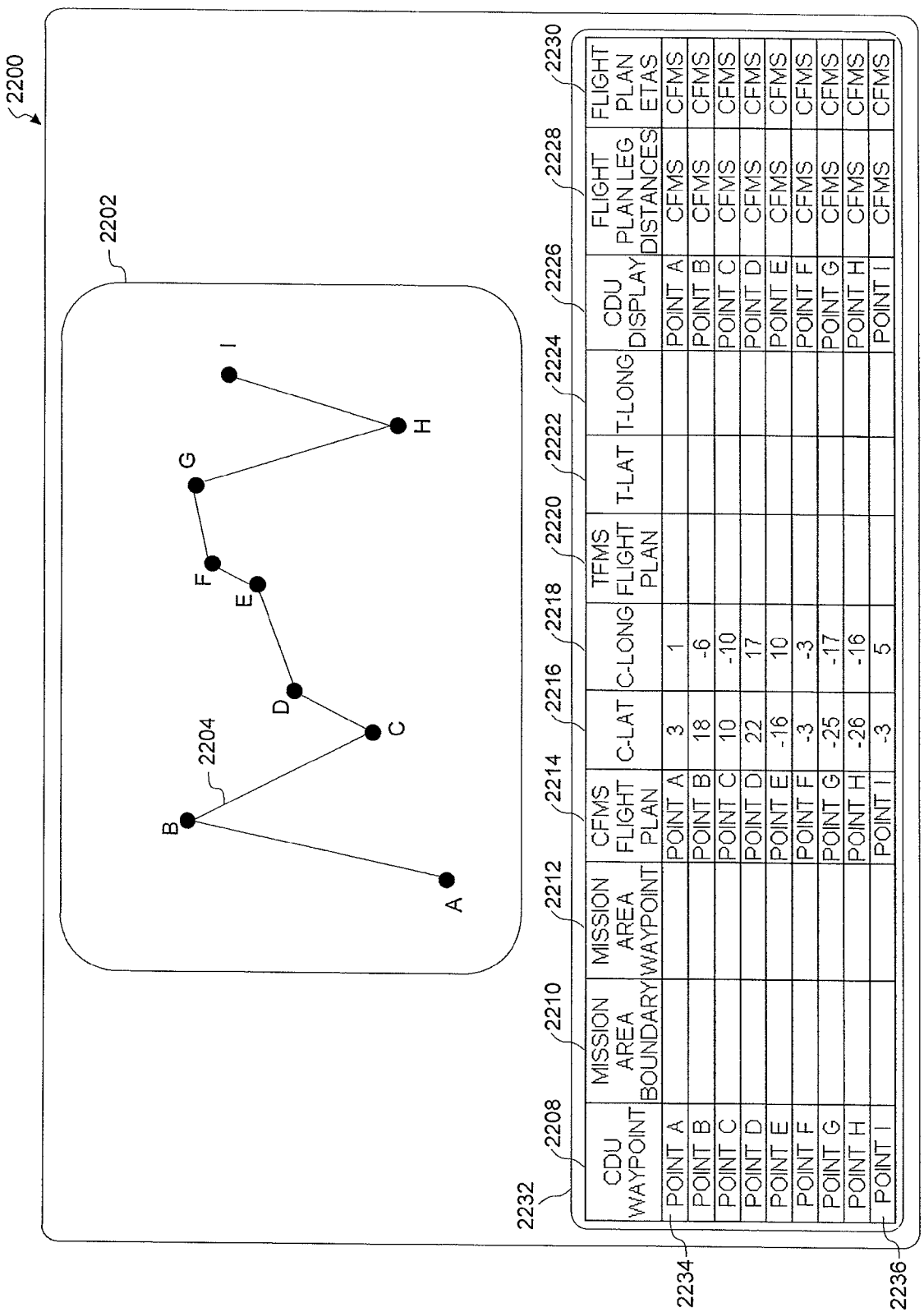
FIG. 22 is a unified user interface system showing an exemplary display of a unified flight plan containing only civilian waypoints.

FIG. 22 is a unified user interface system showing an exemplary display of a unified flight plan containing only civil waypoints. System 2200 can include a graphical flight plan display 2202, and/or a textual flight plan display 2232. The textual flight plan display 2232 can include a control display unit (CDU) waypoint user entry 2208, a mission boundary area user selection 2210, a mission area waypoints display 2212, a civil flight management system component flight plan waypoints display 2214, a civil waypoint latitude display 2216, a civil waypoint longitude 2218, a tactical flight management system component flight plan waypoints display 2220, a tactical waypoint latitude display 2222, a tactical waypoint longitude display 2224, a control display unit (CDU) waypoint display 2226, a flight plan leg distances display 2228, a flight plan estimated time of arrival display 2230, a starting waypoint display row 2234, and a ending waypoint display row 2236. The graphical flight plan display 2202 can include a graphical flight plan 2204.

In operation, a user of the flight management system can enter an ordered list of waypoints that can be reflected in the control display unit (CDU) waypoint user entry column 2208. The first of the ordered list of waypoints can be displayed in the starting waypoint display row 2234 followed by the subsequent waypoints with the last ordered waypoint displayed in the ending waypoint display row 2236. The user can designate a tactical flight plan entry waypoint and tactical flight plan exit waypoint which will be reflected in the mission boundary area user selection 2210. Based on the user input reflected in the control display unit (CDU) waypoint user entry 2208 and the mission boundary area user selection 2210, the remaining displays (2212-2230) can be populated according to the process shown in FIGS. 19, 20, and 21 by including the user entries (2208 and 2210) in the flight management system input dataset and/or populating the remaining displays (2212-2230) based on the unified flight management system response message and/or drawing the graphical flight plan 2204 based on the unified flight management system response message.

For example, the user can enter waypoints A-I reflected in the control display unit (CDU) waypoint user entry 2208 and the user can select no waypoints as tactical flight plan entry/exit waypoints as reflected in the mission boundary area user selection 2210. In this example, the waypoints A, B, C, D, E, F, G, H, and I are part of the civil flight management system component flight plan and according to the process described in FIGS. 19, 20, and 21 the civil flight management system input data portion will include waypoints A, B, C, D, E, F, G, H, and I. In this example, no waypoints are included in the tactical flight management system input data portion, and the unified flight management system response message can include data as shown in 2212-2230, indicating that all waypoints are part of the civil flight plan as shown in the civil flight management system component flight plan waypoints display 2214.

It will be appreciated that the user can enter data using a keyboard, mouse, touch screen, voice recognition dictation, or any other manner of data entry now known or later developed.

Additionally, the data displayed in 2212-2230 can be dynamically selected at design and/or runtime to include any data available from either the civil or tactical flight management systems for display and to be included in the unified flight management system response message as shown in FIGS. 19, 20, and 21.

FIG. 23 is a unified user interface system showing an exemplary display of a unified flight plan containing only civil waypoints. System 2300 can include a graphical flight plan display 2302, and/or a textual flight plan display 2332. The textual flight plan display 2332 can include a control display unit (CDU) waypoint user entry 2308, a mission boundary area user selection 2310, a mission area waypoints display 2312, a civil flight management system component flight plan waypoints display 2314, a civil waypoint latitude display 2316, a civil waypoint longitude 2318, a tactical flight management system component flight plan waypoints display 2320, a tactical waypoint latitude display 2322, a tactical waypoint longitude display 2324, a control display unit (CDU) waypoint display 2326, a flight plan leg distances display 2328, a flight plan estimated time of arrival display 2330, a starting waypoint display row 2334, and a ending waypoint display row 2336. The graphical flight plan 2302 can include a graphical civil flight plan portion 2304 and a graphical tactical flight plan portion 2306.

In operation, a user of the flight management system can enter an ordered list of waypoints that can be reflected in the control display unit (CDU) waypoint user entry column 2308. The first of the ordered list of waypoints can be displayed in the starting waypoint display row 2334 followed by the subsequent waypoints with the last ordered waypoint displayed in the ending waypoint display row 2336. The user can designate a tactical flight plan entry waypoint and tactical flight plan exit waypoint which will be reflected in the mission boundary area user selection 2310. Based on the user input reflected in the control display unit (CDU) waypoint user entry 2308 and the mission boundary area user selection 2210, the remaining displays (2312-2330) can be populated according to the process shown in FIGS. 19, 20, and 21 by including the user entries (2308 and 2310) in the flight management system input dataset and/or populating the remaining displays (2312-2330) based on the unified flight management system response message and/or drawing the flight plans 2304 and 2306.

For example, the user can enter waypoints A-I reflected in the control display unit (CDU) waypoint user entry 2308 and the user can select waypoint C as the tactical flight plan entry waypoint and waypoint G as the tactical flight plan exit waypoint as reflected in the mission boundary area user selection 2310. In this example, according to the process described in FIGS. 19, 20, and 21, the civil flight management system input data portion can include all waypoints A-C and G-I, and the tactical flight management system input data portion can include waypoints C-G. Continuing this example, the unified flight management system response message can include data as shown in 2312-2330, and the graphical civil flight plan portion 2304 represented as a solid line, and the graphical tactical flight plan portion 2306 represented as a dashed line, can be displayed in the graphical flight plan 2302.

It will be appreciated that the user can enter data using a keyboard, mouse, touch screen, voice recognition dictation, or any other manner of data entry now known or later developed.

Additionally, the data displayed in 2312-2330 can be dynamically selected at design and/or runtime to include any data available from either the civil or tactical flight management systems and included in the unified flight management system response message as shown in FIGS. 19, 20, and 21.

It will be appreciated that the modules, processes, systems, and sections described above can be implemented in hardware, hardware programmed by software, software instructions stored on a nontransitory computer readable medium or a combination of the above. A dual core flight management system, for example, can include using a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, or another structured or object-oriented programming language. The sequence of programmed instructions and data associated therewith can be stored in a nontransitory computer-readable medium such as a computer memory or transponder device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the computer programming and network security arts.

Moreover, embodiments of the disclosed method, system, and computer program product can be implemented in software executed on a programmed general purpose computer, a special purpose computer, a microprocessor, or the like.

It is, therefore, apparent that there is provided, in accordance with the various embodiments disclosed herein, computer systems, methods and software for dual core flight management systems.

While the invention has been described in conjunction with a number of embodiments, it is evident that many alternatives, modifications and variations would be or are apparent to those of ordinary skill in the applicable arts. Accordingly, Applicants intend to embrace all such alternatives, modifications, equivalents and variations that are within the spirit and scope of the invention.

What is claimed is:

1. A computerized method for providing a unified user interface to a plurality of flight management systems encapsulated within a flight management system, the method comprising:
   receiving, at a processor programmed to provide a unified user interface, a flight management system input dataset from a flight management system user interface device;
   creating, with the processor programmed to provide a unified user interface, a plurality of flight management system input data portions based on said flight management system input dataset, said plurality of flight management system input data portions to be transmitted to a plurality of destination flight management systems, each flight management system input data portion corresponding to one of said plurality of destination flight management systems;
   transmitting, from the processor, each of said plurality of flight management system input data portions to said corresponding destination flight management system;
   receiving, at the processor, a plurality of flight management system response messages from said plurality of destination flight management systems;
   creating, with the processor, a unified flight management system response message based on said plurality of flight management system response messages; and
   transmitting, from the processor, said unified flight management system response message to the flight management system user interface device,
   whereby the unified flight management system response message causes the flight management system user interface device to display a consolidated view of the plurality of flight management system response messages.

2. A computerized method for providing a unified user interface to a plurality of flight management system components encapsulated within a flight management system, the method comprising:
   receiving, at a processor programmed to provide a unified user interface, a flight management system input dataset from a flight management system user interface device;
   creating, with the processor programmed to provide a unified user interface, a plurality of flight management system input data portions based on said flight management system input dataset, said plurality of flight management system input data portions to be transmitted to a plurality of destination flight management system components, each flight management system input data portion corresponding to one of said plurality of destination flight management system components;
   transmitting, from the processor, each of said plurality of flight management system input data portions to said corresponding destination flight management system component;
   receiving, at the processor, a plurality of flight management system component response messages from said plurality of destination flight management system components;
   creating, with the processor, a unified flight management system response message based on said plurality of flight management system component response messages; and
   transmitting, from the processor, said unified flight management system response message to the flight management system user interface device,
   whereby the unified flight management system response message causes the flight management system user interface device to display a consolidated view of the plurality of flight management system component response messages, and
   wherein said plurality of destination flight management system components includes a civil flight management system component and a tactical flight management system component, and said plurality of flight management system input data portions includes:
      a civil flight management system input data portion to be transmitted to said civil flight management system component; and
      a tactical flight management system input data portion to be transmitted to said tactical flight management system component.

3. The method of claim 2, wherein said flight management system input dataset includes an ordered plurality of waypoints including a plurality of civil waypoints and a plurality of tactical waypoints, and creating a plurality of flight management system data portions based on said flight management system input dataset includes:
   populating said civil flight management system input data portion with said plurality of civil waypoints, and
   populating said tactical flight management system input data portion with said plurality of tactical waypoints.

4. The method of claim 3, wherein said plurality of flight management system component response messages includes a civil flight plan based on said civil flight management system input data portion and a tactical flight plan based on said tactical flight management system input data portion, and creating a unified flight management system response message based on said plurality of flight management system component response messages includes creating a unified flight plan merging said civil flight plan and said tactical flight plan.

5. The method of claim 2,
wherein said flight management system input dataset includes an ordered plurality of flight plan waypoints, one of said ordered plurality of flight plan waypoints selected as a tactical flight plan entry waypoint, one of said ordered plurality of flight plan waypoints selected as a tactical flight plan exit waypoint,
wherein creating a plurality of flight management system input data portions based on said flight management system input dataset includes:
- populating said civil flight management system input data portion to include said ordered plurality of waypoints excluding waypoints ordered between said tactical flight plan entry waypoint and said tactical flight plan exit waypoint, and
- populating said tactical flight management system input data portion to include said ordered plurality of waypoints excluding waypoints ordered before said tactical flight plan entry waypoint and excluding waypoints ordered after said tactical flight plan exit waypoint, wherein said plurality of flight management system component response messages includes a civil flight plan based on said civil flight management system input data portion and a tactical flight plan based on said tactical flight management system input data portion, and
wherein creating a unified flight management system response message based on said plurality of flight management system component response messages includes creating a unified flight plan merging said civil flight plan and said tactical flight plan.

\* \* \* \* \*